United States Patent
Owoeye et al.

(10) Patent No.: US 12,404,804 B1
(45) Date of Patent: Sep. 2, 2025

(54) HEAT EXCHANGERS FOR GAS TURBINE ENGINES

(71) Applicant: General Electric Company, Schenectady, NY (US)

(72) Inventors: Eyitayo James Owoeye, Houston, TX (US); William D. Gerstler, Niskayuna, NY (US); Daniel J. Erno, Clifton Park, NY (US); Lana Maria Osusky, Rexford, NY (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 18/586,886

(22) Filed: Feb. 26, 2024

(51) Int. Cl.
*F02C 7/14* (2006.01)
*F02C 6/08* (2006.01)

(52) U.S. Cl.
CPC .................. *F02C 6/08* (2013.01); *F02C 7/14* (2013.01); *F05D 2250/18* (2013.01); *F05D 2260/213* (2013.01)

(58) Field of Classification Search
CPC ....... F02C 7/14; F02C 6/08; F28F 1/36; F28F 1/38; F28F 9/22; F28F 2250/04; F28F 2250/10; F28F 9/26; F28F 13/06; F28F 2250/06
USPC ........................................ 165/156, 184, 139
See application file for complete search history.

(56) References Cited

U.S. PATENT DOCUMENTS

| | | | |
|---|---|---|---|
| 10,100,736 B2 | 10/2018 | Niergarth et al. | |
| 10,539,076 B2 | 1/2020 | Niergarth et al. | |
| 10,739,077 B2 | 8/2020 | Gerstler et al. | |
| 10,775,046 B2 | 9/2020 | Snyder et al. | |
| 10,830,147 B2 | 11/2020 | Snyder | |
| 10,830,540 B2 | 11/2020 | Sennoun et al. | |
| 10,982,553 B2 | 4/2021 | Rathay et al. | |
| 11,118,784 B2 | 9/2021 | Sweeney et al. | |
| 11,209,222 B1 | 12/2021 | Colson | |
| 11,359,864 B2 | 6/2022 | Becene et al. | |
| 11,519,332 B1 | 12/2022 | Underwood et al. | |
| 2010/0038056 A1 | 2/2010 | Ellsworth et al. | |
| 2014/0076293 A1* | 3/2014 | Gaiser | F28D 7/0066 165/100 |
| 2019/0024987 A1* | 1/2019 | Moore | F28F 3/02 |
| 2020/0016704 A1 | 1/2020 | Stewart, Jr. et al. | |
| 2021/0180885 A1 | 6/2021 | Wiedenhoefer et al. | |

(Continued)

FOREIGN PATENT DOCUMENTS

| | | |
|---|---|---|
| CN | 109585035 B | 6/2020 |
| CN | 112833685 A | 5/2021 |
| FR | 2377013 A1 | 8/1978 |

*Primary Examiner* — Gerald L Sung

(74) *Attorney, Agent, or Firm* — Dority & Manning, P.A.

(57) ABSTRACT

A heat exchanger for a gas turbine engine includes an outer shell extending between a first end and a second end opposite the first end. The outer shell defines a first fluid chamber, a first fluid inlet adjacent the first end, and a first fluid outlet adjacent the second end. The outer shell also defines a first plurality of second fluid inlet openings located between the first end and the second end and a second fluid outlet adjacent the second end. The heat exchanger includes a manifold disposed within the outer shell. The manifold defines a second fluid chamber and a second plurality of second fluid inlet openings. The heat exchanger defines a first fluid pathway and a second fluid pathway.

19 Claims, 13 Drawing Sheets

(56) References Cited

U.S. PATENT DOCUMENTS

2021/0207897 A1  7/2021  Sabo et al.
2022/0026155 A1  1/2022  Zaffetti et al.

\* cited by examiner

HEAT EXCHANGERS FOR GAS TURBINE ENGINES

FIELD

The present disclosure relates to heat exchangers for gas turbine engines.

BACKGROUND

A gas turbine engine generally includes a turbomachine and a rotor assembly. Gas turbine engines, such as turbofan engines, may be used for aircraft propulsion. In the case of a turbofan engine, the rotor assembly may be configured as a fan assembly.

Gas turbine engines typically incorporate one or more heat exchangers to control thermal energy of various fluids passing through various components of the gas turbine engine. However, heat exchangers that reduce the weight and complexity of gas turbine engines are desirable.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
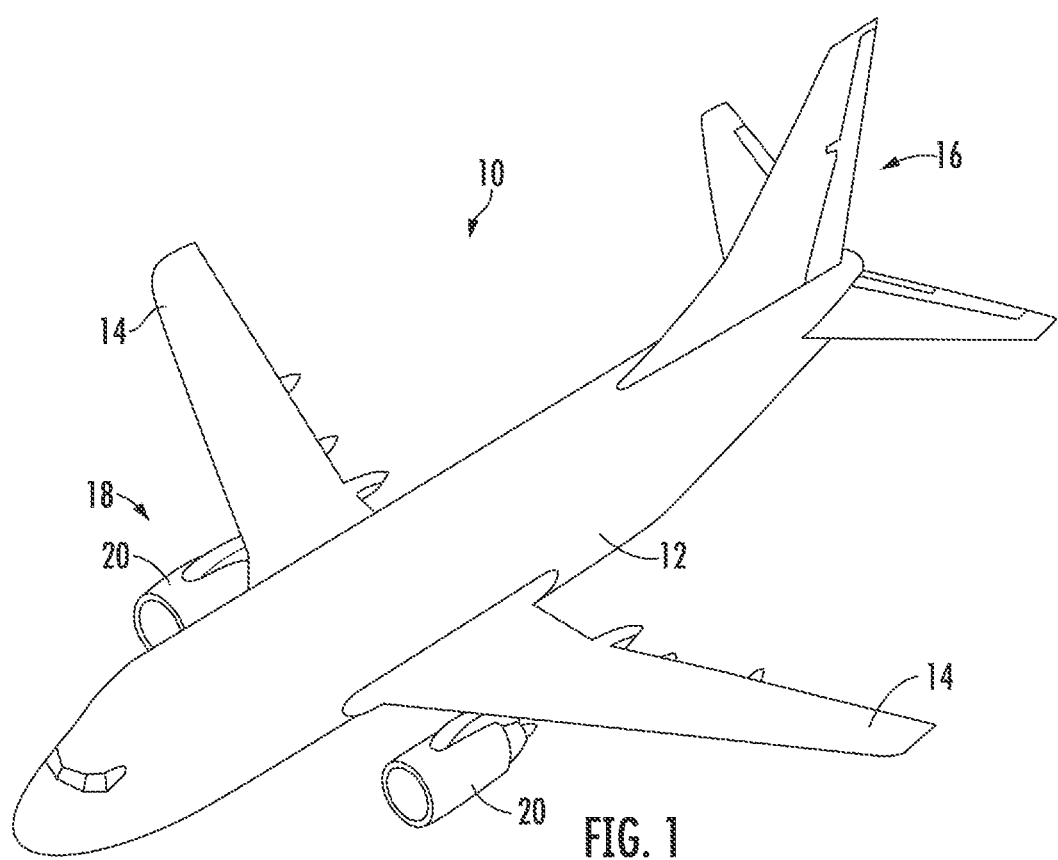
FIG. 1 is perspective view of an exemplary aircraft in accordance with an exemplary embodiment of the present disclosure.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

The singular forms "a", "an", and "the" include plural references unless the context clearly dictates otherwise.

As used herein, the terms "first", "second", and "third" may be used interchangeably to distinguish one component from another and are not intended to signify location or importance of the individual components.

Furthermore, the terms "upstream" and "downstream" refer to the relative direction with respect to fluid flow in a fluid pathway. For example, "upstream" refers to the direction from which the fluid flows, and "downstream" refers to the direction to which the fluid flows.

Additionally, the terms "low," "high," or their respective comparative degrees (e.g., lower, higher, where applicable) each refer to relative speeds, pressures or temperatures within an engine or thermal management system, unless otherwise specified. For example, a "low-pressure turbine" operates at a pressure generally lower than a "high-pressure turbine." Alternatively, unless otherwise specified, the aforementioned terms may be understood in their superlative degree. For example, a "low-pressure turbine" may refer to the lowest maximum pressure turbine within a turbine section, and a "high-pressure turbine" may refer to the highest maximum pressure turbine within the turbine section.

The terms "coupled," "fixed," "attached to," and the like refer to both direct coupling, fixing, or attaching, as well as indirect coupling, fixing, or attaching through one or more intermediate components or features, unless otherwise specified herein.

The present disclosure is generally related to heat exchangers for gas turbine engines. Conventional thermal management systems route hot engine fluid to external heat exchangers for cooling. Routing such hot engine fluids requires additional piping and larger pump sizes in order to route the engine fluid, which increases the weight of the gas turbine engine. However, including a heat exchanger directly within a fluid or a fluid pathway may reduce the amount of routing, piping, and pumps required to pass the engine fluid through the heat exchanger for cooling.

Referring now to the drawings, FIG. 1 is a perspective view of an exemplary aircraft 10 in accordance with an exemplary embodiment of the present disclosure.

The aircraft 10 includes a fuselage 12, wings 14 attached to the fuselage 12, and an empennage 16. The aircraft 10 further includes a propulsion system 18 that produces a propulsive thrust to propel the aircraft 10 in flight, during taxiing operations, etc. Although the propulsion system 18 is shown attached to the wings 14, in other example embodiments it may additionally or alternatively include one or more aspects coupled to other parts of the aircraft 10, such as, for example, the empennage 16, the fuselage 12, or both. The configuration of the aircraft 10 described above and shown in FIG. 1 is provided only to place the present subject matter in an exemplary field of use. Thus, the present subject matter may be readily adaptable to any manner of aircraft.

The propulsion system 18 includes at least one engine. In the exemplary embodiment shown, the aircraft 10 includes a pair of gas turbine engines 20. Each gas turbine engine 20 is mounted to the aircraft 10 in an under-wing configuration. Each gas turbine engine 20 is capable of selectively generating a propulsive thrust for the aircraft 10. The gas turbine engines 20 may be configured to burn various forms of fuel including, but not limited to unless otherwise provided, jet fuel/aviation turbine fuel, and hydrogen fuel.

Figure 2:
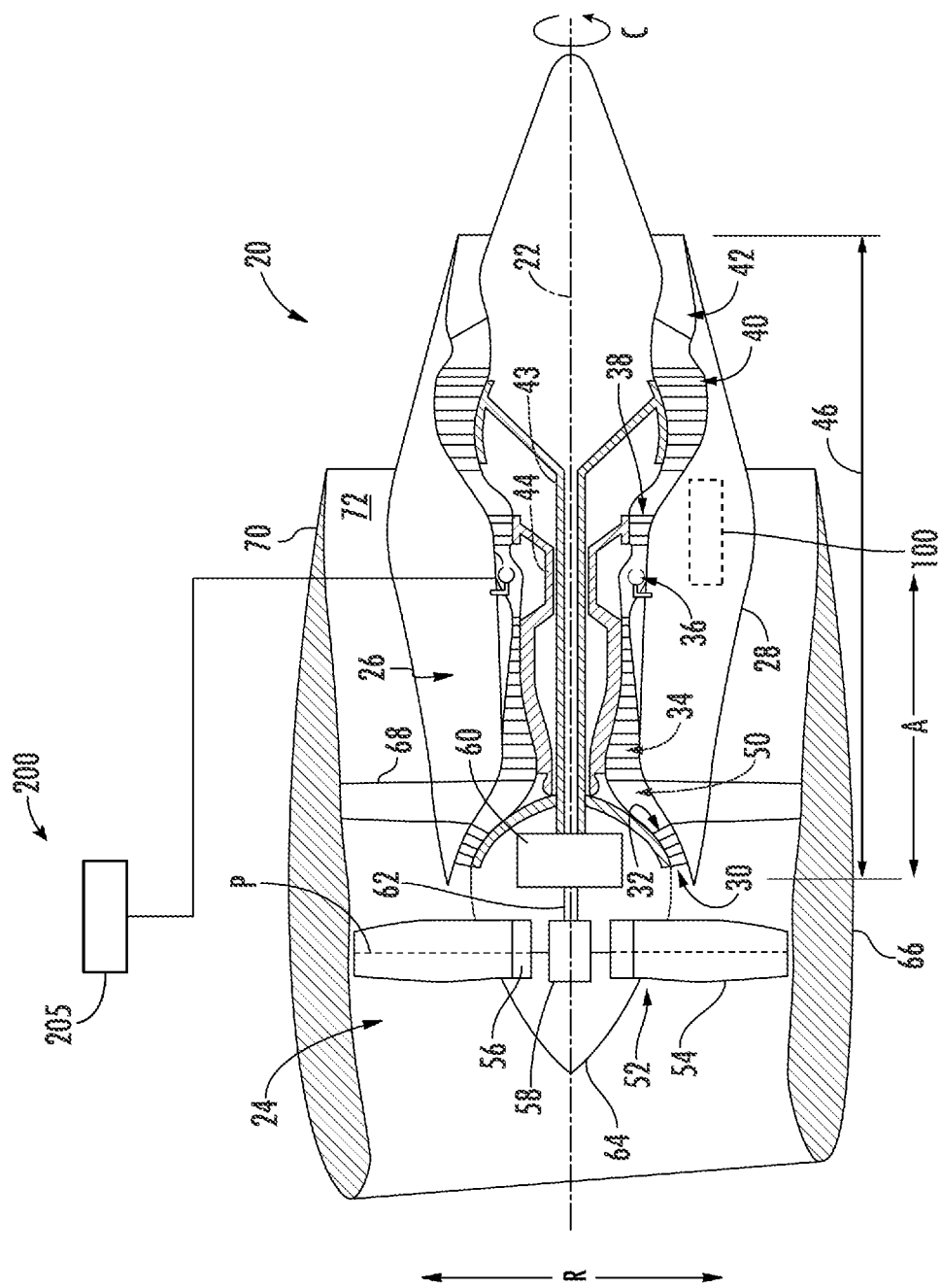
FIG. 2 is a cross-sectional view of a gas turbine engine in accordance with an exemplary aspect of the present disclosure.

FIG. 2 is a cross-sectional view of a gas turbine engine in accordance with an exemplary aspect of the present disclosure.

In at least one example embodiment, the gas turbine engine 20 is a multi-spool, high-bypass turbofan jet engine, sometimes also referred to as a "turbofan engine." As shown in FIG. 2, the gas turbine engine 20 defines an axial direction "A" (extending parallel to a longitudinal centerline 22 provided for reference), a radial direction "R", and a circumferential direction "C" extending about the longitudinal centerline 22. In general, the gas turbine engine 20 includes a fan section 24 and a turbomachine 26 disposed downstream from the fan section 24.

The turbomachine 26 depicted generally includes an engine housing, casing, or core cowl 28 that defines an annular core inlet 30. The core cowl 28 at least partially encases, in serial flow relationship, a compressor section including a booster or low-pressure compressor ("LPC") 32 and a high-pressure compressor ("HPC") 34, a combustion section 36, a turbine section including a high-pressure turbine ("HPT") 38 and a low-pressure turbine ("LPT") 40, and at least a portion of a jet exhaust nozzle 42. Together, these components or sections make up a core engine 46 of the turbomachine 26.

The turbomachine 26 includes a high-pressure shaft 44 drivingly connecting the high-pressure turbine 38 to the high-pressure compressor 34, and a low-pressure shaft 43 drivingly connecting the low-pressure turbine 40 to the low-pressure compressor 32. The compressor section, combustion section 36, turbine section, and jet exhaust nozzle 42 together define a working gas flow path 50 (also referred to as a core air flow path) through the gas turbine engine 20.

For the embodiment depicted, the fan section 24 includes a fan 52 having a plurality of fan blades 54 coupled to a disk 56 in a spaced apart manner. As depicted, the fan blades 54 extend outwardly from disk 56 generally along the radial direction R. Each fan blade 54 is rotatable with the disk 56 about a pitch axis P by virtue of the fan blades 54 being operatively coupled to a pitch change mechanism 58 configured to collectively vary the pitch of the fan blades 54, e.g., in unison. The fan blades 54, disk 56, and pitch change mechanism 58 are together rotatable about the longitudinal centerline 22 by the low-pressure shaft 43.

In an exemplary embodiment, as shown in FIG. 2, the gas turbine engine 20 further includes a power gearbox or gearbox 60. The gearbox 60 includes a plurality of gears for adjusting a rotational speed of the fan 52 relative to a rotational speed of the low-pressure shaft 43, such that the fan 52 and the low-pressure shaft 43 may rotate at more efficient relative speeds. The gearbox 60 may be any type of gearbox suitable to facilitate coupling the low-pressure shaft 43 to the fan 52 while allowing each of the low-pressure turbine 40 and the fan 52 to operate at a desired speed. For example, in some embodiments, the gearbox 60 may be a reduction gearbox. Utilizing a reduction gearbox may enable the comparatively higher speed operation of the low-pressure turbine 40 while maintaining fan speeds sufficient to provide for increased air bypass ratios, thereby allowing for efficient operation of the gas turbine engine 20. Moreover, utilizing a reduction gearbox may allow for a reduction in turbine stages that would otherwise be present (e.g., in direct drive engine configurations), thereby providing a reduction in weight and complexity of the engine.

Referring still to the exemplary embodiment of FIG. 2, disk 56 is connected to the gearbox 60 via a fan shaft 62 of the gas turbine engine 20. The disk 56 is covered by a front hub 64 of the fan section 24 (sometimes also referred to as a "spinner"). The front hub 64 is aerodynamically contoured to promote an airflow through the plurality of fan blades 54. Additionally, the fan section 24 includes an annular fan casing or nacelle 66 that circumferentially surrounds the fan 52 and/or at least a portion of the turbomachine 26. The nacelle 66 is supported relative to the turbomachine 26 by a plurality of circumferentially spaced struts or outlet guide vanes 68 in the embodiment depicted. Moreover, a downstream section 70 of the nacelle 66 extends over an outer portion of the turbomachine 26 to define a bypass airflow passage 72 therebetween.

In at least one example embodiment, such as the exemplary embodiment shown, the aircraft 10 includes a fuel delivery system 200 for providing a fuel flow to a combustor of the combustion section 36 of the turbomachine 26. The fuel delivery system 200 includes a fuel source, such as a fuel tank 205, for storing the fuel. Although not depicted, the fuel tank 205 may be positioned in one or both of the wings 14.

In at least one example embodiment, such as the exemplary embodiment shown, the aircraft 10 may include one or more accessory systems configured to support the operation of the gas turbine engines 20 or the aircraft 10 including the gas turbine engines 20. For example, the gas turbine engine 20 includes a lubrication system 100 configured to provide a lubricant to, e.g., various bearings and gear meshes in the compressor section (including the low-pressure compressor 32 and high-pressure compressor 34), the turbine section (including the high-pressure turbine 38 and the low-pressure turbine 40), the high-pressure shaft 44, the low-pressure shaft 43, and the gearbox 60. The lubricant provided by the lubrication system 100 may increase the useful life of such components and may remove a certain amount of heat from such components.

Figure 3:
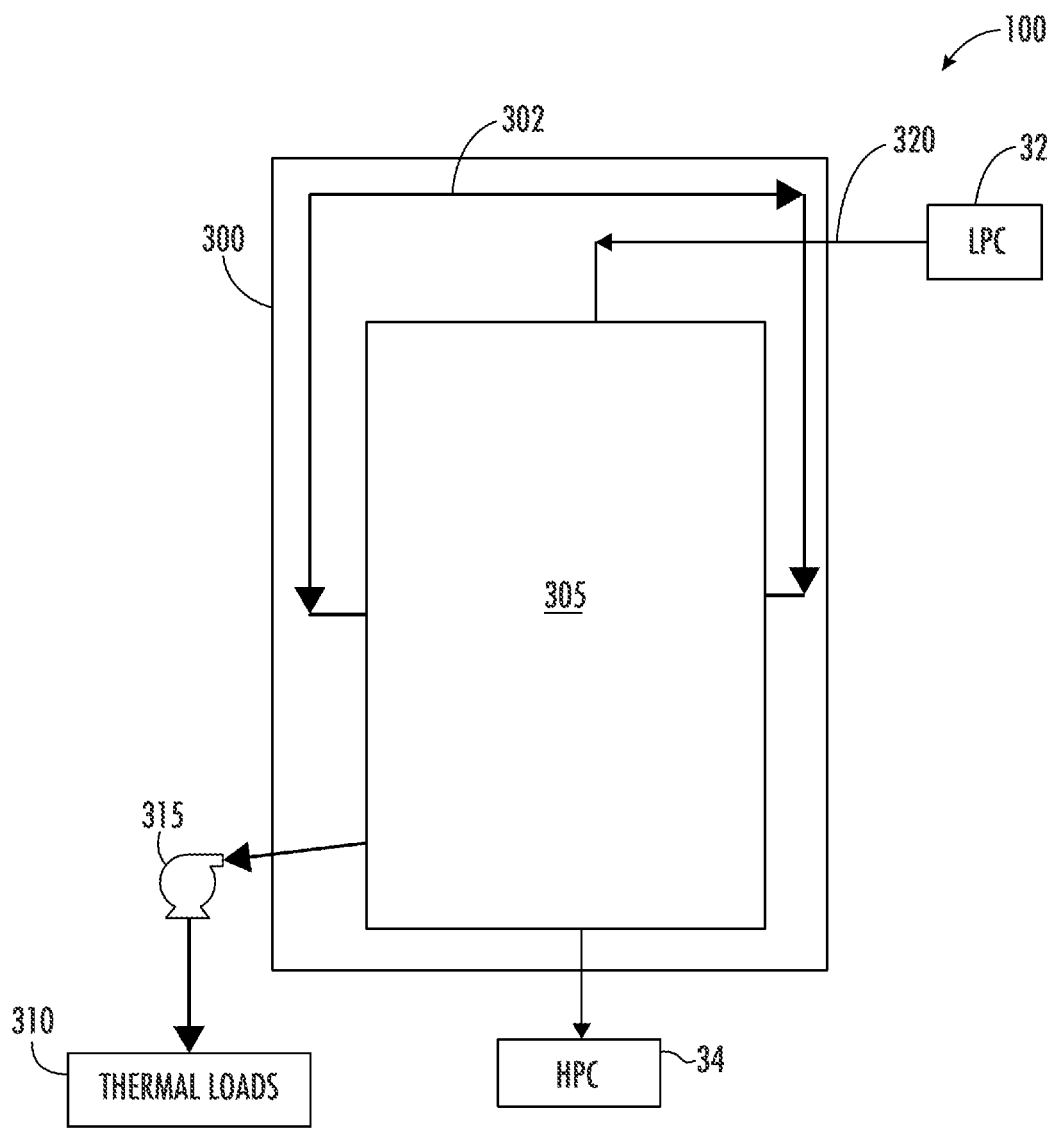
FIG. 3 is a schematic view of a lubrication system in accordance with an exemplary aspect of the present disclosure.

FIG. 3 is a schematic view of a lubrication system 100 in accordance with an exemplary aspect of the present disclosure. The lubrication system 100 may be configured in a similar manner as the exemplary lubrication system 100 discussed above with reference to FIG. 2.

In at least one example embodiment, the lubrication system 100 includes a first fluid circuit 302 in fluid communication with a sump 300, a heat exchanger 305, one or more thermal loads 310, and a pump 315. The sump 300 is configured to store a thermal fluid, and the pump 315 is configured to circulate the thermal fluid through the first fluid circuit 302. The one or more thermal loads 310 may include engine bearings, an accessory gearbox, a reduction gearbox, or a combination thereof. In at least one example embodiment, the thermal fluid is an oil-based lubricant or lubrication oil. Additionally, the first fluid circuit 302 may be formed of one or more fluid conduits.

In at least one example embodiment, such as the exemplary embodiment depicted, the heat exchanger 305 is disposed within the sump 300. Accordingly, the heat exchanger 305 is in direct fluid communication with the thermal fluid stored within the sump 300 through the first fluid circuit 302, as will be discussed in greater detail with respect to FIGS. 4A-4E, below. Positioning the heat exchanger 305 in direct fluid communication with the sump 300 may reduce the weight and complexity of the gas turbine engine 20. For example, fluid lines associated with the lubrication system 100 may be reduced such that there are no fluid lines extending through the working gas flow path 50 of the gas turbine engine 20 to the sump 300.

In at least one example embodiment, a second fluid circuit 320 is in fluid communication with the heat exchanger 305. The second fluid circuit 320 is fluidly isolated from the first fluid circuit 302, as will also be discussed in greater detail with respect to FIGS. 4A-4E, below. The second fluid circuit 320 may be in fluid communication with one or more components of the gas turbine engine 20. Fluid within the second fluid circuit 320 can be any fluid, or mixture of fluids, flowing in the liquid or gaseous state, or flowing in a mixed two-phase state, suitable for meeting thermal performance needs within the gas turbine engine 20. For example, cooling air from the low-pressure compressor 32 may flow into the heat exchanger 305 and remove heat from the thermal fluid within the heat exchanger 305. The cooling air absorbs heat from the thermal fluid and is then directed out of the heat exchanger 305 to the high-pressure compressor 34, which may improve the thermal efficiency of the high-pressure compressor 34. Additionally, because heat is removed from the thermal fluid, the cooled thermal fluid is directed to the one or more thermal loads 310 downstream of the heat exchanger 305.

In other example embodiments, the heat exchanger 305 may be disposed or embedded within the core cowl 28, such as in an undercowl region of the core cowl 28, within the bypass airflow passage 72, or any other suitable location for cooling components of the gas turbine engine 20. Moreover, the heat exchanger 305 may comprise a gas-to-gas heat exchanger, a gas-to-liquid heat exchanger, or a liquid-to-liquid heat exchanger. In still other example embodiments, the heat exchanger 305 may comprise an air-to-air heat exchanger that is embedded within or in fluid communication with the undercowl region of the core cowl 28 to cool full authority digital engine control ("FADEC") components.

Figure 4A:
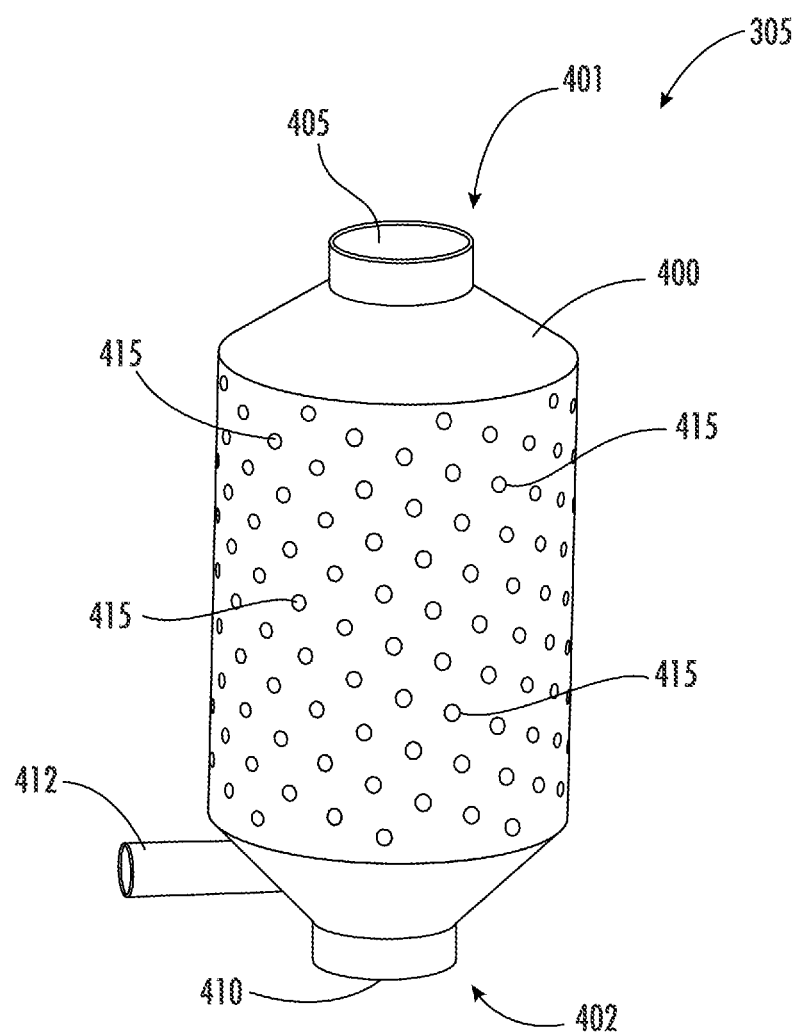
FIG. 4A is a perspective view of a heat exchanger in accordance with an exemplary aspect of the present disclosure.
Figure 4B:
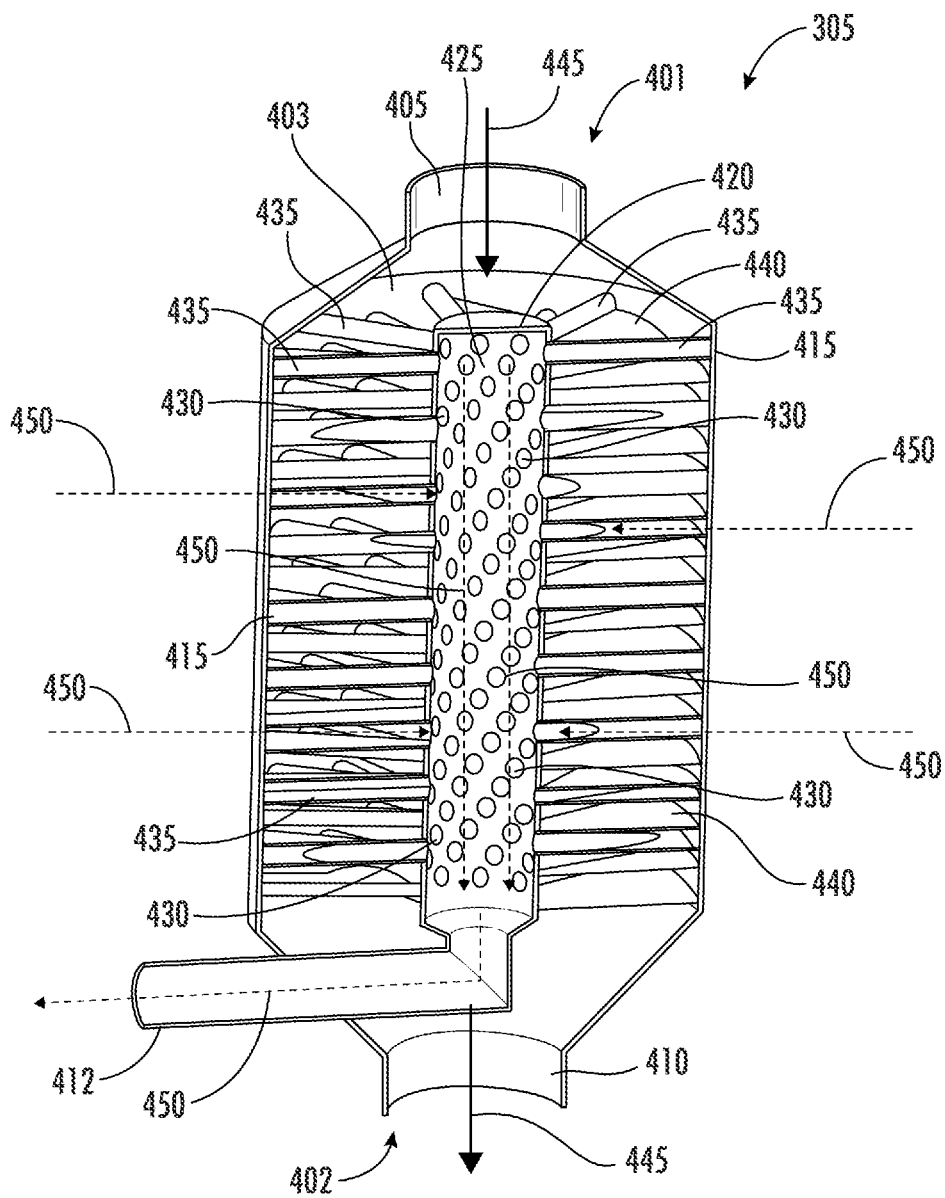
FIG. 4B is a cross-section view of the heat exchanger of FIG. 4A in accordance with an exemplary aspect of the present disclosure.
Figure 4C:
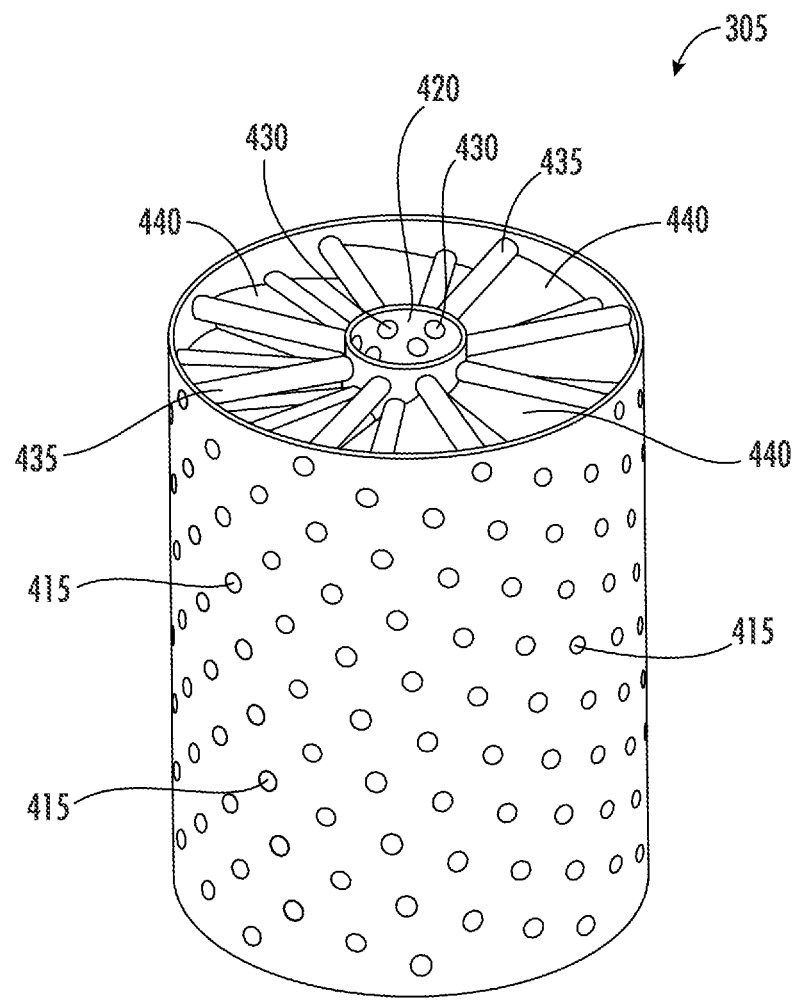
FIG. 4C is a partial, top view of the heat exchanger of FIG. 4A in accordance with an exemplary aspect of the present disclosure.
Figure 4D:
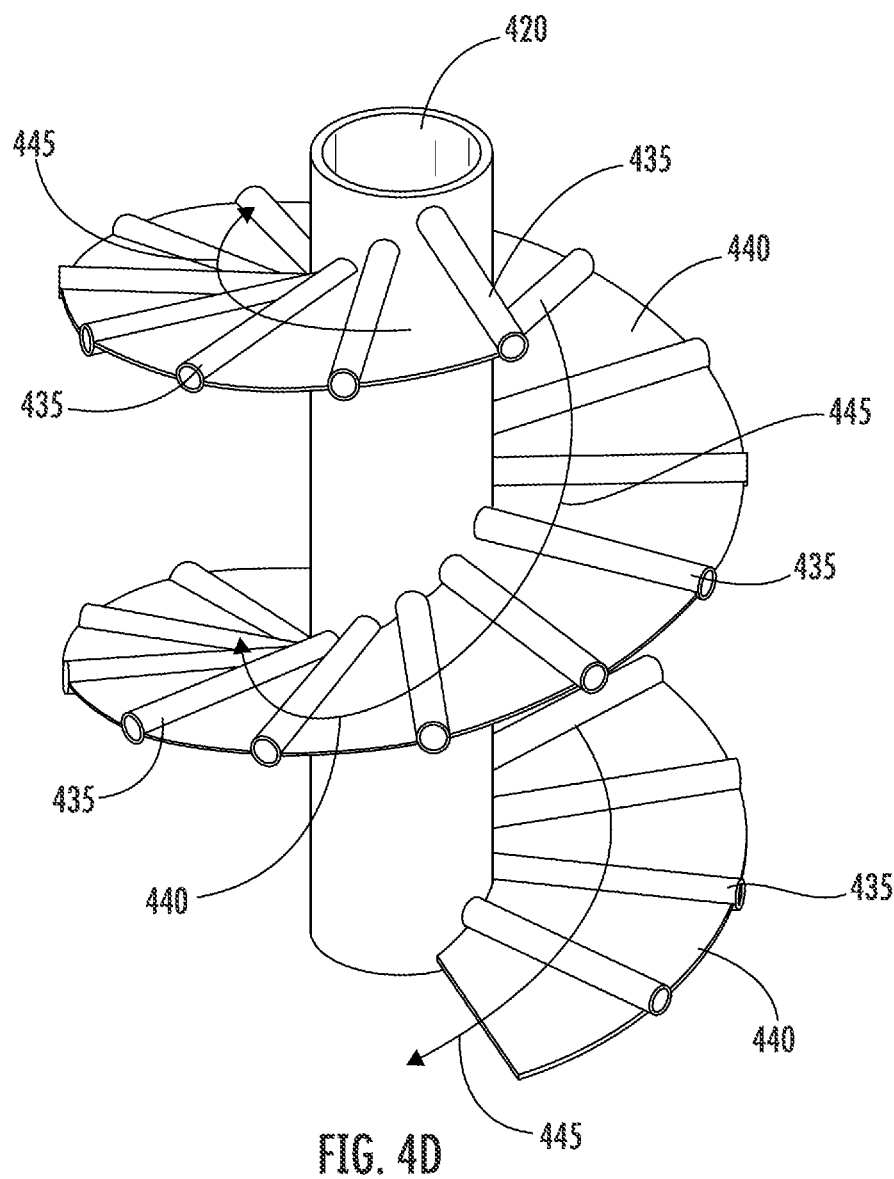
FIG. 4D is an interior view of the heat exchanger of FIG. 4A in accordance with an exemplary aspect of the present disclosure.
Figure 4E:
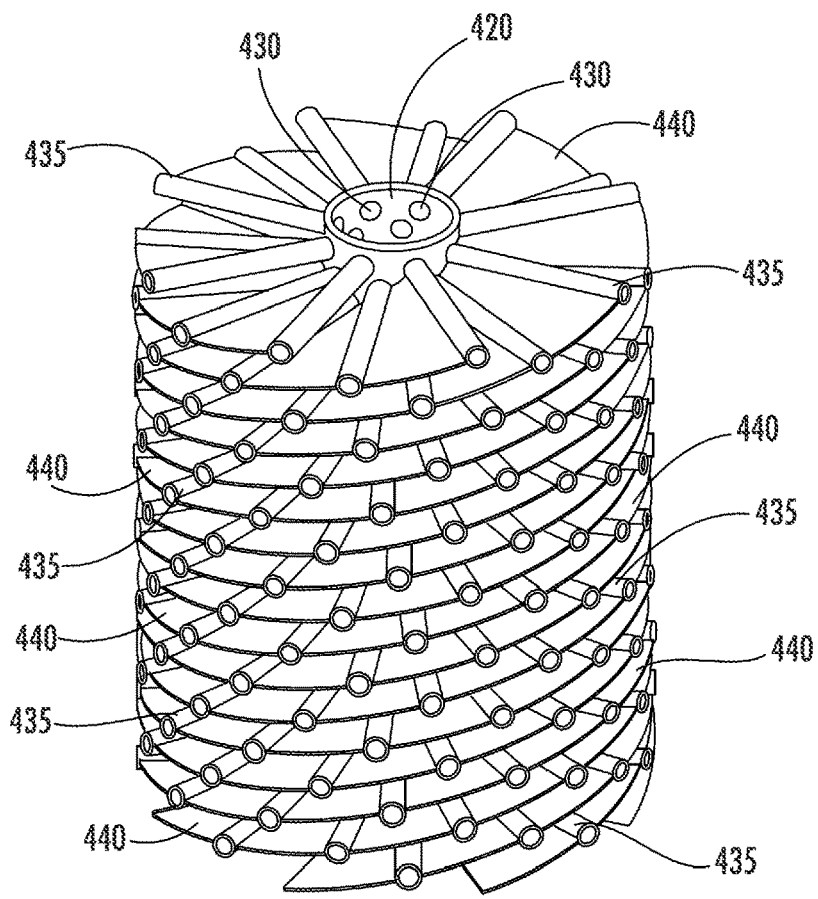
FIG. 4E is an interior view of the heat exchanger of FIG. 4A in accordance with an exemplary aspect of the present disclosure.

FIG. 4A is a perspective view of a heat exchanger 305 in accordance with an exemplary aspect of the present disclosure. FIG. 4B is a cross-section view of the heat exchanger 305 of FIG. 4A in accordance with an exemplary aspect of the present disclosure. FIG. 4C is a partial, top view of the heat exchanger 305 of FIG. 4A in accordance with an exemplary aspect of the present disclosure. FIG. 4D is an interior view of the heat exchanger 305 of FIG. 4A in accordance with an exemplary aspect of the present disclosure. FIG. 4E is an interior view of the heat exchanger 305 of FIG. 4A in accordance with an exemplary aspect of the present disclosure. The exemplary heat exchanger 305 of FIGS. 4A through 4E may be incorporated into the lubrication system 100 described above with respect to FIG. 3 (e.g., as the heat exchanger 305 depicted).

In at least one example embodiment, the heat exchanger 305 includes an outer shell 400 extending between a first end 401 and a second end 402 opposite the first end 401. The outer shell 400 defines a first fluid chamber 403 (see FIG. 4B), a first fluid inlet 405 adjacent the first end 401 (see FIGS. 4A, 4B), and a first fluid outlet 410 adjacent the second end 402 (see FIGS. 4A, 4B). The first fluid inlet 405 and the first fluid outlet 410 are in fluid communication with the first fluid chamber 403. The outer shell 400 also defines at least a portion of a second fluid outlet 412. For example, the second fluid outlet 412 may extend from at least a portion of the outer shell 400 adjacent the second end 402, as shown in FIG. 4A. In at least one example embodiment, such as the exemplary embodiment depicted, the outer shell 400 has a cylindrical shape.

In other example embodiments, however, the outer shell 400 may have a triangular, rectangular, or other polygonal shape.

In at least one example embodiment, such as the exemplary embodiment depicted, the outer shell 400 defines a first plurality of second fluid inlet openings 415 between the first end 401 and the second end 402. The first plurality of second fluid inlet openings 415 may be spaced about a circumference of the outer shell 400. In some example embodiments, such as the exemplary embodiment depicted, the first plurality of second fluid inlet openings 415 may be evenly spaced about the outer shell 400.

It will be appreciated, however, that in other example embodiments, the first plurality of second fluid inlet openings 415 may be unevenly spaced about the outer shell 400. In some additional example embodiments, the first plurality of second fluid inlet openings 415 may be staggered about the outer shell 400. For example, a row or column of the first plurality of second fluid inlet openings 415 may be offset from an adjacent row or column of the first plurality of second fluid inlet openings 415. In still other example embodiments, a row or column of the first plurality of second fluid inlet openings 415 may be aligned with an adjacent row or column of the first plurality of second fluid inlet openings 415.

In at least one example embodiment, the heat exchanger 305 further includes a manifold 420 disposed within the first fluid chamber 403 of the heat exchanger 305 such that the first fluid chamber 403 is defined between the outer shell 400 and the manifold 420. The manifold 420 defines a second fluid chamber 425 and a second plurality of second fluid inlet openings 430 in fluid communication with the second fluid chamber 425. In at least one example embodiment, an end of the manifold 420 adjacent the first end 401 of the outer shell 400 is sealed and an opposite end of the manifold 420 is in fluid communication with the second fluid outlet 412, as shown in FIG. 4B. In at least one example embodiment, such as the exemplary embodiment depicted, the manifold 420 includes a cylindrical shape.

It will be appreciated, however, that in other example embodiments, the manifold 420 comprises a conical shape. For example, a diameter of the manifold may increase or decrease from the end adjacent the first end 401 to the opposite end adjacent the second end 402.

In at least one example embodiment, the second plurality of second fluid inlet openings 430 may be arranged about the manifold 420 in a helical pattern, as shown in FIGS. 4D-4E. The heat exchanger 305 may also include a plurality of tubes 435. The plurality of tubes 435 may fluidly couple the first plurality of second fluid inlet openings 415 to the second plurality of second fluid inlet openings 430. In at least one example embodiment, the plurality of tubes 435 comprise a cylindrical shape extending between the first plurality of second fluid inlet openings 415 and the second plurality of second fluid inlet openings 430.

In other example embodiments, one or more of the plurality of tubes 435 may comprise a tortuous, twisted, coiled, or zig-zag shape.

In at least one example embodiment, the heat exchanger 305 includes a plurality of baffles 440. Each of the plurality of baffles 440 are coupled between each of the plurality of tubes 435. Accordingly, the plurality of tubes 435 and the plurality of baffles 440 may also be arranged in a helical pattern, as shown in FIGS. 4D-4E. Moreover, the plurality of baffles 440 coupled between each of the plurality of tubes 435 act as tube fins to increase heat transfer surface area, which increases the efficiency of the heat exchanger 305.

In at least one example embodiment, the heat exchanger 305 defines a first fluid pathway 445 defining at least a portion of the second fluid circuit 320. The first fluid pathway 445 extends from the first fluid inlet 405, through the first fluid chamber 403, and to the first fluid outlet 410. Moreover, the first fluid pathway 445 extends through the first fluid chamber 403 following the helical path defined by the plurality of tubes 435 and the plurality of baffles 440, as shown in FIG. 4D. In at least one example embodiment, the first fluid pathway 445 may make two or more turns about the manifold 420, as shown in FIGS. 4D-4E. In additional example embodiments, each of the plurality of tubes 435 and the plurality of baffles 440 may be coupled such that the first fluid pathway 445 is continuous about the manifold 420. In other example embodiments, the first fluid pathway 445 may be non-continuous such that one or more of the plurality of tubes 435 are not coupled to one or more of the plurality of baffles 440.

The heat exchanger 305 also defines a second fluid pathway 450 defining at least a portion of the first fluid circuit 302. The second fluid pathway 450 is fluidly isolated from the first fluid pathway 445. The second fluid pathway 450 extends from the first plurality of second fluid inlet openings 415, through the second plurality of second fluid inlet openings 430, and to the second fluid outlet 412. More specifically, the second fluid pathway 450 is defined by the first plurality of second fluid inlet openings 415, the plurality of tubes 435, the second plurality of second fluid inlet openings 430, and the second fluid outlet 412.

In at least one example embodiment, the first fluid pathway 445 is configured to receive a first fluid and the second fluid pathway 450 is configured to receive a second fluid. The first fluid may comprise a gas and the second fluid may comprise a liquid. For example, the second fluid pathway 450 may be configured to receive the thermal fluid through the first plurality of second fluid inlet openings from the sump 300 via the first fluid circuit 302 and the first fluid pathway 445 may be configured to receive a flow of the cooling air into the first fluid inlet 405 from the low-pressure compressor 32 via the second fluid circuit 320. The flow of cooling air is configured to circulate through the heat exchanger 305 in the helical pattern defined by the first fluid pathway 445. The helical pattern of the first fluid pathways 445 enables the flow of cooling air to contact a greater surface area of the manifold 420, the plurality of tubes 435, and the plurality of baffles 440, which also act as tube fins, as discussed above, maximizing heat transfer between the cooling air and the thermal fluid. For example, the flow of cooling air is able to absorb a greater amount of heat from the thermal fluid flowing through the second fluid pathway 450 as the cooling air flows along the plurality of tubes 435 and the plurality of baffles 440 from the first fluid inlet 405 to the first fluid outlet 410. Additionally, heat transfer effectiveness also increases by increasing the number of turns of the helical pattern of the first fluid pathway 445. Accordingly, a temperature of the cooling air increases as it flows through the heat exchanger 305 such that the air exiting via the first fluid outlet 410 has a higher temperature than the air that entered via the first fluid inlet 405.

Figure 5:
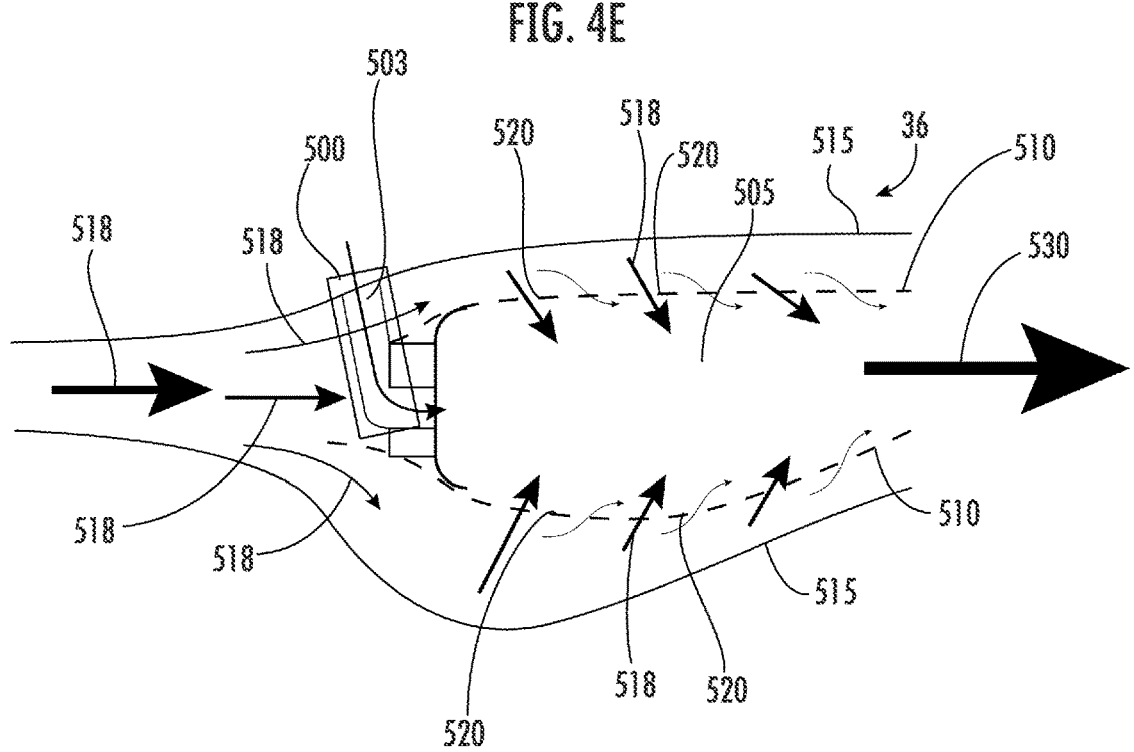
FIG. 5 is a schematic view of a combustion section of a gas turbine engine in accordance with an exemplary aspect of the present disclosure.

Referring now to FIG. 5, a schematic view is provided of a heat exchanger and a combustion section of a gas turbine engine in accordance with another exemplary aspect of the present disclosure. The heat exchanger 305 may be configured in a similar manner as the exemplary heat exchanger 305 discussed above with reference to FIGS. 3 through 4E, and the gas turbine engine may be configured in a similar manner as the exemplary gas turbine engine 20 described above with reference to FIG. 2.

For example, the gas turbine engine includes a combustion section 36 operable with a fuel delivery system 200 of, e.g., an aircraft incorporating the gas turbine engine. For the example embodiment depicted in FIG. 5, the heat exchanger 305 is disposed in fluid communication with the fuel delivery system 200. In particular, the combustion section 36 includes one or more fuel nozzles, such as a fuel injector 500, configured to receive a flow of liquid fuel from a fuel tank 205 through the fuel delivery system and provide the liquid fuel to a combustion chamber 505 of the combustion section 36 for combustion, as indicated by arrow 503. The fuel injector 500 may be any appropriate type of fuel injector, nozzle, fuel/air mixer, or other liquid fuel dispensing device, atomizing device, or mixing device. In at least one example embodiment, the heat exchanger 305 is in direct fluid communication with the fuel injector 500, as will be discussed in greater detail with respect to FIG. 6. Positioning the heat exchanger 305 in direct fluid communication with the fuel injector 500 may reduce the weight and complexity of the gas turbine engine 20. For example, fluid lines associated with the fuel delivery system 200 may be reduced such that there are fewer fluid lines extending through the working gas flow path 50 of the gas turbine engine 20 to the fuel tank 205.

In at least one example embodiment, the combustion section 36 includes an inner liner 510 and an outer liner 515. The inner liner 510 may at least partially define the combustion chamber 505 and a fluid pathway may be defined between the inner liner 510 and the outer liner 515. For example, the fluid pathway between the inner liner 510 and the outer liner 515 may be configured to receive compressed air, indicated by arrows 518, from the high-pressure compressor 34. The inner liner 510 defines a plurality of openings 520 in fluid communication with the combustion chamber 505 such that at least a portion of the compressed air may enter the combustion chamber 505 through the plurality of openings 520.

Referring still to FIG. 5, combustion gases 530 flow from the combustion chamber 505 into the turbine section of the gas turbine engine 20. For example, the combustion gases 530 flow into the high-pressure turbine 38 and the low-pressure turbine 40, as shown in FIG. 2.

Figure 6:
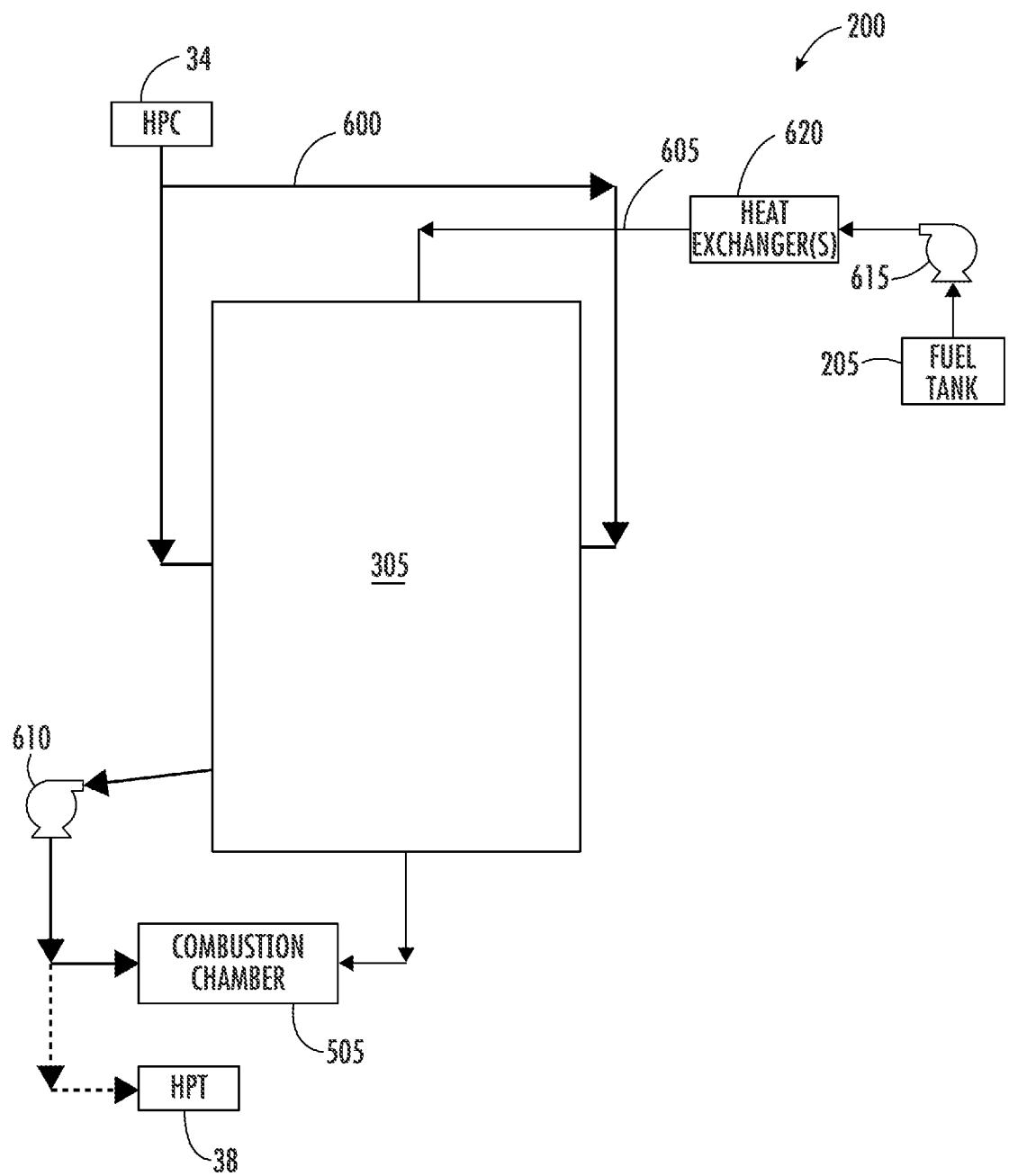
FIG. 6 is a schematic view of a thermal management system in accordance with an exemplary aspect of the present disclosure.

FIG. 6 is a schematic view of a thermal management system in accordance with an exemplary aspect of the present disclosure. The exemplary thermal management system of FIG. 6 may be configured in a similar manner as the exemplary system of FIG. 5.

For example, in the exemplary embodiment depicted, the thermal management system includes a heat exchanger 305 and is operable with a fuel delivery system 200 and a gas turbine engine (not shown). The fuel delivery system 200 includes a first fluid pathway 600 and a second fluid pathway 605. The first fluid pathway 600 is in fluid communication with a high-pressure compressor 34 of the gas turbine engine, the heat exchanger 305, a first pump 610, and the combustion chamber 505. The first fluid pathway 600 may also be in fluid communication with the high-pressure turbine 38, as is indicated by the phantom lines in FIG. 6. The first pump 610 is configured to move air from the heat exchanger 305 to one or both of the combustion chamber 505 and the high-pressure turbine 38.

In at least one example embodiment, the second fluid pathway 605 is in fluid communication with the fuel tank 205, a second pump 615, one or more secondary heat exchangers 620, the heat exchanger 305, and the combustion chamber 505. The second pump 615 is configured to provide a flow of fuel from the fuel tank 205 to the combustion chamber 505. In at least one example embodiment, the flow of fuel may pass through the one or more secondary heat exchangers 620 before entering the heat exchanger 305. The one or more secondary heat exchangers 620 are configured to increase a temperature of the fuel as it travels along the second fluid pathway 605 to the heat exchanger 305.

In at least one example embodiment, the heat exchanger 305 is disposed in direct fluid communication with the fuel injector 500. For example, the heat exchanger 305 may be integrated with a fuel injector stem and immersed in the working gas flow path 50. As will be appreciated, the heat exchanger 305 of FIG. 6 may be configured in substantially the same manner as the exemplary heat exchanger discussed above with reference to FIGS. 4A-4E. In such an exemplary embodiment, with reference back to FIGS. 4A-4E, the first fluid inlet 405 may be configured to receive the flow of fuel through the first fluid inlet 405. The fuel may flow into the first fluid chamber 403 from the first fluid inlet 405 and travel along the helical path of the first fluid pathway 445. For example, fuel may flow through the first fluid inlet 405, along the helical path defined by the plurality of tubes 435 and the plurality of baffles 440 within the first fluid chamber 403, and out of the first fluid outlet 410 to the combustion chamber 505.

Still referring to FIGS. 4A-4E, the first plurality of second fluid inlet openings 415 of the heat exchanger 305 may be configured to receive the compressed air from the high-pressure compressor 34 via the first fluid pathway 600 (FIG. 6). The compressed air may travel along the second fluid pathway 450. For example, the compressed air may enter the second fluid chamber 425 defined by the manifold 420 through the first plurality of second fluid inlet openings 415, the plurality of tubes 435, and the second plurality of second fluid inlet openings 430. The compressed air then exits the heat exchanger through second fluid outlet 412.

In at least one example embodiment, the fuel traveling along the first fluid pathway 445 within the first fluid chamber 403 absorbs heat from the compressed air flowing along the second fluid pathway in the second fluid chamber 425. Accordingly, the fuel acts as a heat sink and absorbs heat from the compressed air before it is discharged from the gas turbine engine 20. Moreover, the temperature of the fuel is increased before the fuel reaches the combustion chamber 505, increasing the efficiency of combustion.

Figure 7A:
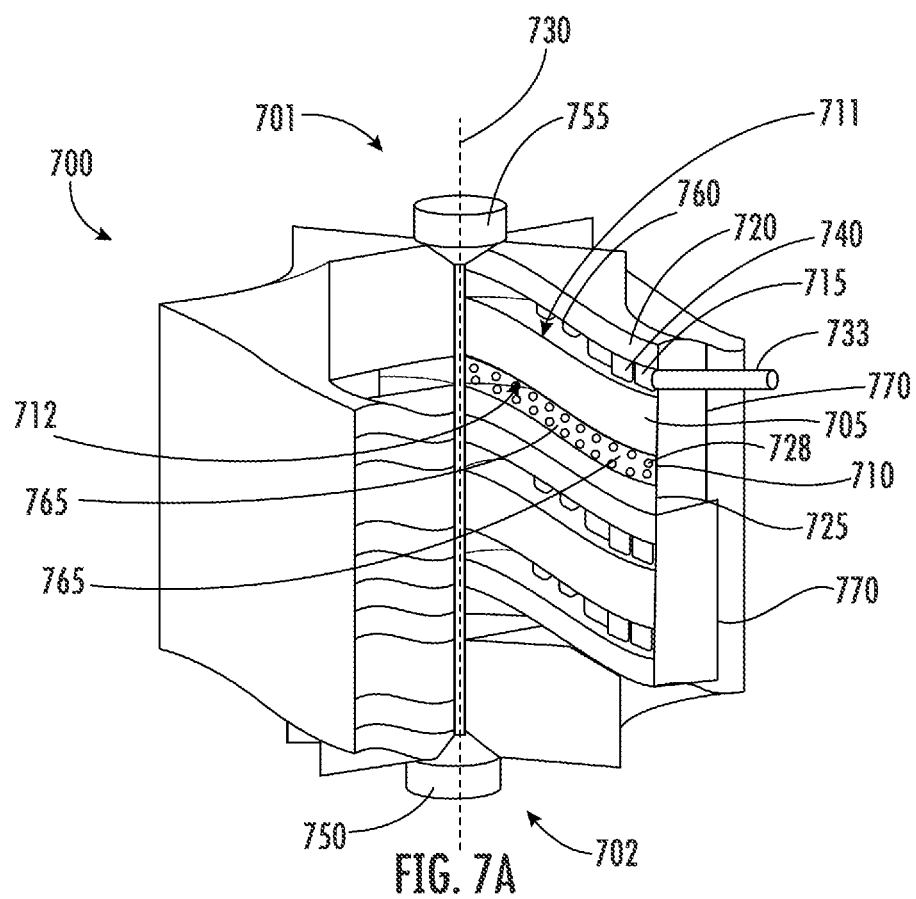
FIG. 7A is a perspective, cross-section view of a heat exchanger in accordance with an exemplary aspect of the present disclosure.
Figure 7B:
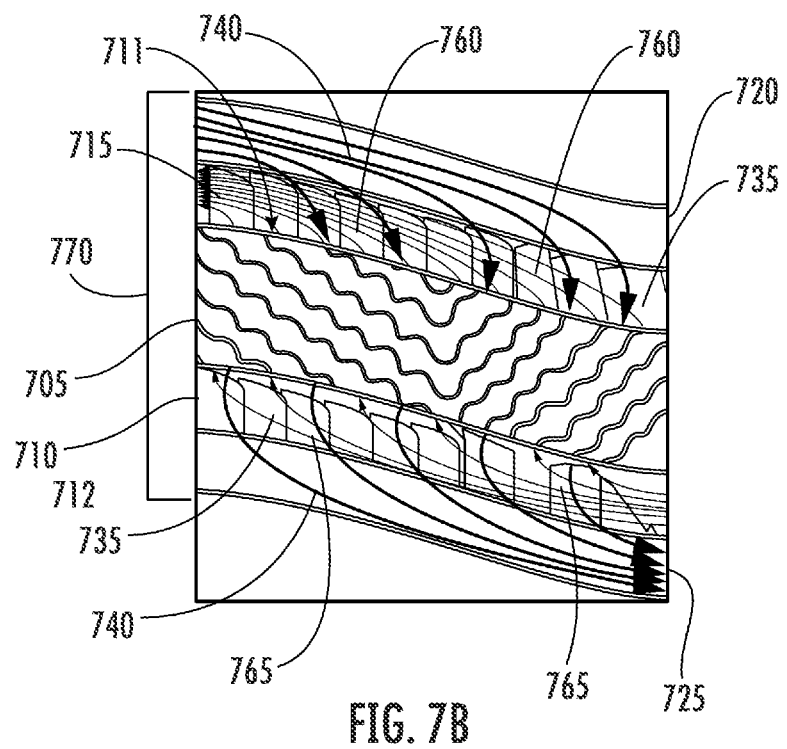
FIG. 7B is a detailed, cross-section view of the heat exchanger of FIG. 7A in accordance with an exemplary aspect of the present disclosure.

Referring now to FIGS. 7A and 7B, FIG. 7A is a perspective, cross-section view of a heat exchanger in accordance with another exemplary aspect of the present disclosure. FIG. 7B is a detailed, cross-section view of the heat exchanger of FIG. 7A in accordance with an exemplary aspect of the present disclosure.

In at least one example embodiment, a heat exchanger 700 includes a core 705, a first fluid inlet manifold 710, a first fluid outlet manifold 715, a second fluid inlet manifold 720, and a second fluid outlet manifold 725. Each of the core 705, the first fluid inlet manifold 710, the first fluid outlet manifold 715, the second fluid inlet manifold 720, and the second fluid outlet manifold 725 may have a helical shape extending about a core axis 730 between a first end 701 and a second end 702 of the heat exchanger 700. In at least one example embodiment, the heat exchanger 700 may comprise a substantially cylindrical shape.

In at least one example embodiment, the core 705 includes a plurality of unit cells. The plurality of unit cells of the core 705 may define a first fluid flow path 735 and a second fluid flow path 740. The first fluid flow path 735 may be fluidly isolated from the second fluid flow path 740. For example, the first fluid flow path 735 may be defined by the first fluid inlet manifold 710, at least a portion of the core 705, and the first fluid outlet manifold 715. The second fluid flow path 740 may be defined by the second fluid inlet manifold 720, at least a portion of the core 705, and the second fluid outlet manifold 725.

In at least one example embodiment, the heat exchanger 700 includes a second fluid inlet nozzle 755 adjacent to the first end 701 and a second fluid outlet nozzle 750 adjacent to the second end 702. In at least one example embodiment, the second fluid inlet nozzle 755 is fluidly coupled to the second fluid inlet manifold 720 and the second fluid outlet nozzle 750 is fluidly coupled to the second fluid outlet manifold 725. For example, the second fluid inlet manifold 720 may be configured to receive a second fluid via the second fluid inlet nozzle 755 and the second fluid outlet manifold 725 may be configured to discharge the second fluid via the second fluid outlet nozzle 750. In at least one example embodiment, the second fluid comprises a gas. For example, the gas may include bleed air from one or both of the low-pressure compressor 32 and the high-pressure compressor 34.

In at least one example embodiment, the first fluid inlet manifold 710 defines a plurality of first fluid inlets 728. For example, an outer circumferential end of the first fluid inlet manifold 710 defines the plurality of first fluid inlets 728 extending to an outer casing of the heat exchanger 700. The plurality of first fluid inlets 728 may comprise a plurality of perforations or openings. In at least one example embodiment, the heat exchanger 700 also includes a first fluid outlet nozzle 733 adjacent the first end 701. For example, the first fluid outlet nozzle 733 is fluidly coupled to the first fluid outlet manifold 715. In at least one example embodiment, the first fluid inlet manifold 710 receives the first fluid via the plurality of first fluid inlets 728 and the first fluid outlet nozzle 733 is configured to discharge the first fluid from the first fluid inlet manifold 710. The first fluid may comprise a liquid. For example, the first fluid may include fuel from the fuel tank 205 or a thermal fluid, such as oil, from the sump 300. In at least one example embodiment, the first fluid inlet manifold 710 includes a first plurality of tubes 760 and the first fluid outlet manifold 715 includes a second plurality of tubes 765. The first plurality of tubes 760 and the second plurality of tubes 765 extended substantially perpendicular to a length of the first fluid inlet manifold 710 and the first fluid outlet manifold 715, respectively. The first plurality of tubes 760 and the second plurality of tubes 765 are configured to fluidly couple the second fluid flow path 740 to the core 705. For example, the first plurality of tubes 760 fluidly couple the second fluid inlet manifold 720 to the core 705 and the second plurality of tubes 765 fluidly couple the core 705 to the second fluid outlet manifold 725. Accordingly, the second fluid flow path 740 is configured to flow through the second fluid inlet manifold 720, the first plurality of tubes 760, the core 705, the second plurality of tubes 765, and the second fluid outlet manifold 725.

Additionally, the first plurality of tubes 760 and the second plurality of tubes 765 fluidly isolate the first fluid flow path 735 from the second fluid flow path 740. For example, the first fluid flow path 735 is defined between the first plurality of tubes 760 within the first fluid outlet manifold 715 and between the second plurality of tubes 765 within the first fluid inlet manifold 710. While the first fluid flow path 735 is fluidly isolated from the second fluid flow path 740, the first fluid flow path 735 and the second fluid flow path 740 are in thermal communication through the first plurality of tubes 760 and the second plurality of tubes 765. Such thermal communication increases the surface area for heat transfer and may reduce the size and weight of the heat exchanger 305. For example, the size, wall thickness, and material type of the first plurality of tubes 760 and the second plurality of tubes 765 can be engineered to determine the desired thermal resistance between the first fluid flow path 735 and the second fluid flow path 740 that occurs through the first plurality of tubes 760 and the second plurality of tubes 765.

In at least one example embodiment, the heat exchanger 700 may be disposed in a sump, such as the sump 300 discussed above with respect to FIG. 3. In such embodiments, the second fluid inlet manifold 720 receives the second fluid, such as a cooling airflow from the compressor section of the gas turbine engine 20, such as from the high-pressure compressor 34 or the low-pressure compressor 32, via the second fluid inlet nozzle 755. The second fluid flows along the second fluid flow path 740 from the second fluid inlet manifold 720, through the first plurality of tubes 760, and to the core 705. Additionally, the first fluid inlet manifold 710 is configured to receive the first fluid. For example, the first fluid may be a thermal fluid or oil received from the sump 300, as discussed with respect to FIG. 3. The thermal fluid or oil flows along the first fluid flow path 735 from the first fluid inlet manifold 710 and into the core 705, via the plurality of first fluid inlets 728. Within the core 705, the second fluid (or the cooling airflow) is configured to absorb heat from the first fluid. The helical patterns of the first fluid flow path 735 and the second fluid flow path 740 about the first fluid inlet manifold 710, the first fluid outlet manifold 715, the second fluid inlet manifold, 720, the second fluid outlet manifold 725, and the core 705 maximizes heat transfer as the flow of cooling air contacts a greater surface of the second fluid within the core 705 of the heat exchanger 700. For example, the cooling air flow is able to absorb a greater amount of heat from the first fluid. Accordingly, a temperature of the cooling air increases such that the second fluid has a greater temperature as it flows from the core 705, through the second fluid outlet manifold 725, and out of the heat exchanger 700 via the second fluid outlet nozzle 750. Moreover, a temperature of the first fluid decreases as it flows out of the core 705, through the first fluid outlet manifold 715, and out of the heat exchanger 700 via the first fluid outlet nozzle 733.

In other example embodiments, the heat exchanger 700 may be in fluid communication with the fuel injector 500 and immersed in the working gas flow path 50, as discussed with respect to FIG. 6. In such embodiments, the second fluid inlet manifold 720 may be configured to receive fuel from the fuel tank 205 via the second fluid inlet nozzle 755. The fuel may flow along the second fluid flow path 740 from the second fluid inlet manifold 720 and into the core 705. Additionally, the first fluid inlet manifold 710 may be configured to receive compressed air from the high-pressure compressor 34. The compressed air may flow from the first fluid inlet manifold 710 into the core 705 via the plurality of first fluid inlets 728. Within the core 705, the fuel absorbs heat from the compressed air. Accordingly, the fuel acts as a heat sink and absorbs heat from the compressed air before it is discharged from the gas turbine engine 20. Moreover, the temperature of the fuel is increased before the fuel reaches the combustion chamber 505, increasing the efficiency of combustion.

From the core 705, the fuel flows along the second fluid flow path 740 to the second fluid outlet manifold 725, where the fuel is then discharged from the heat exchanger 700 via the second fluid outlet nozzle 750. The compressed air, which has now been cooled by the fuel, exits the core 705 and flows along the first fluid flow path 735 to the first fluid outlet manifold 715, where the compressed air is discharged from the heat exchanger 700 via the first fluid outlet nozzle 733.

In at least one example embodiments, the first fluid flow path 735 is configured to flow in a first direction and the second fluid flow path 740 is configured to flow in a second direction. The second direction may be opposite from the first direction such that the first fluid flow path 735 and the second fluid flow path 740 are in a counter-flow arrangement. For example, the first fluid flow path 735 may flow in a helical pattern about the core axis 730 from the second end 702 to the first end 701 of the heat exchanger 700. The second fluid flow path 740 may flow in a helical pattern about the core axis 730 from the first end 701 to the second end 702 of the heat exchanger 700.

In other example embodiments (not shown), the second direction may be the same as the first direction, such as in a co-flow arrangement. For example, the first fluid flow path 735 may flow in a helical pattern about the core axis 730 from the first end 701 to the second end 702 of the heat exchanger 700. The second fluid flow path 740 may flow in a helical pattern about the core axis 730 from the first end 701 to the second end 702 of the heat exchanger 700.

In at least one example embodiment, the core 705, the first fluid inlet manifold 710, the first fluid outlet manifold 715, the second fluid inlet manifold 720, and the second fluid outlet manifold 725 are arranged in a stacked relationship. For example, the first fluid inlet manifold 710 may be adjacent a second side 712 of the core 705 and the first fluid outlet manifold 715 may be adjacent a first side 711 of the core 705. Additionally, the second fluid inlet manifold 720 may be adjacent the first fluid outlet manifold 715 and the second fluid outlet manifold 725 may be adjacent the first fluid inlet manifold 710. For example, the first fluid inlet manifold 710 may be between the core 705 and the second fluid outlet manifold 725 and the first fluid outlet manifold 715 may be positioned between the core 705 and the second fluid inlet manifold 720. In such embodiments, the first fluid outlet manifold 715 and the second fluid inlet manifold 720 may be stacked from the first side 711 of the core 705 and the first fluid inlet manifold 710 and the second fluid outlet manifold 725 may be stacked from the second side 712 of the core 705.

In at least one example embodiment, the heat exchanger 700 includes a plurality of modules 770. For example, each of the plurality of modules 770 may include the core 705, the first fluid inlet manifold 710, the first fluid outlet manifold 715, the second fluid inlet manifold 720, and the second fluid outlet manifold 725. As shown in FIG. 7A, each of the plurality of modules 770 may be stacked to form the heat exchanger 700. Additionally, the core 705, the first fluid inlet manifold 710, the first fluid outlet manifold 715, the second fluid inlet manifold 720, and the second fluid outlet manifold 725 of each of the plurality of modules 770 may be fluidly coupled such that the first fluid flow path 735 and the second fluid flow path 740 are continuous through each of the plurality of modules 770. The plurality of modules 770 allow a size of the heat exchanger 700 to be customizable to suit a particular need and based on a desired position of the heat exchanger 700 within the gas turbine engine 20. For example, a size of the heat exchanger 700 may be modified based on whether the heat exchanger 700 is disposed in the sump 300 (as discussed with respect to FIG. 3) or disposed in a fluid communication with the working gas flow path 50 (as discussed with respect to FIG. 6).

Figure 8A:
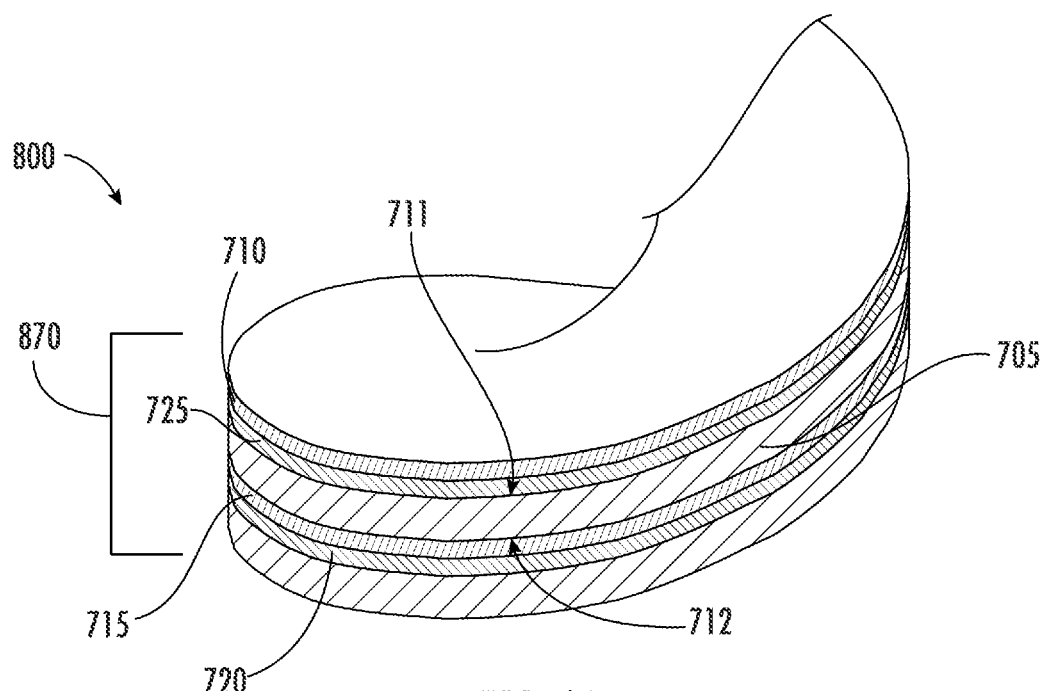
FIG. 8A is an interior view of a heat exchanger in accordance with an exemplary aspect of the present disclosure.
Figure 8B:
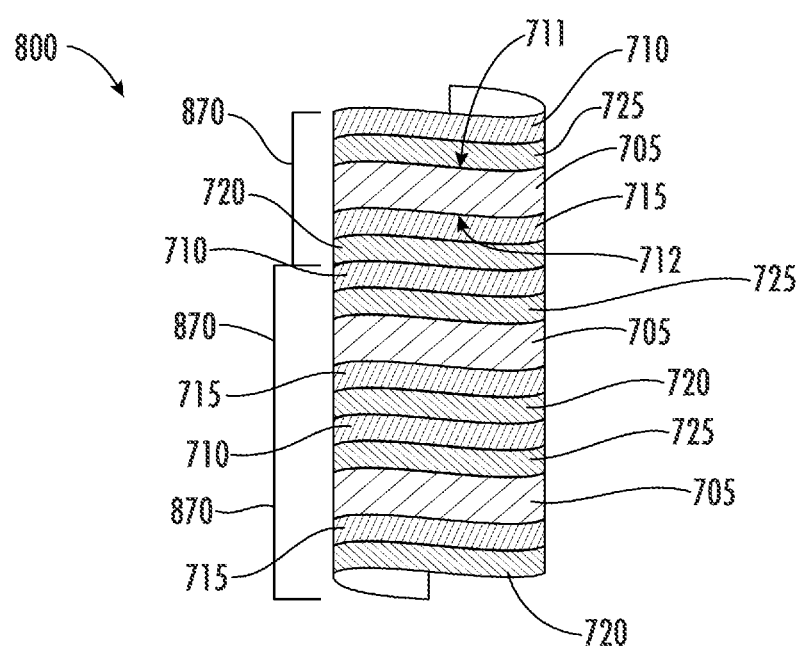
FIG. 8B is an interior view of a heat exchanger in accordance with an exemplary aspect of the present disclosure.

FIG. 8A is an interior view of a heat exchanger in accordance with an exemplary aspect of the present disclosure. FIG. 8B is an interior view of a heat exchanger in accordance with an exemplary aspect of the present disclosure.

In at least one example embodiment, a heat exchanger 800 may be similar or analogous to the heat exchanger 700 discussed above with respect to FIGS. 7A-7B. For example, the heat exchanger 800 includes the core 705, the first fluid inlet manifold 710, the first fluid outlet manifold 715, the second fluid inlet manifold 720, and the second fluid outlet manifold 725. However, the first fluid inlet manifold 710, the first fluid outlet manifold 715, the second fluid inlet manifold 720, and the second fluid outlet manifold 725 of FIGS. 8A-8B may be positioned differently relative to the core 705 compared to the heat exchanger 700 discussed with respect to FIGS. 7A-7B.

In at least one example embodiment, the core 705, the first fluid inlet manifold 710, the first fluid outlet manifold 715, the second fluid inlet manifold 720, and the second fluid outlet manifold 725 are arranged in a stacked relationship. For example, the second fluid outlet manifold 725 and the first fluid inlet manifold 710 may be adjacent the first side 711 of the core 705, and the first fluid outlet manifold 715 and the second fluid inlet manifold 720 are adjacent the second side 712 of the core 705. Moreover, the second fluid outlet manifold 725 may be between the core 705 and the first fluid inlet manifold 710. The first fluid outlet manifold 715 may be between the core 705 and the second fluid inlet manifold 720. In such embodiments, the second fluid outlet manifold 725 and the first fluid inlet manifold 710 may be stacked from the first side 711 of the core and the first fluid outlet manifold 715 and the second fluid inlet manifold 720 may be stacked from the second side 712 of the core 705. In other example embodiments, the second fluid inlet manifold 720 may be adjacent the first side 711 of the core 705, such as between the core 705 and the first fluid inlet manifold 710, and the second fluid outlet manifold 725 may be adjacent the second side 712 of the core 705, such that the first fluid outlet manifold 715 is between the core 705 and the second fluid outlet manifold 725.

In at least one example embodiment, the heat exchanger 800 includes a plurality of modules 870. Each of the plurality of modules 870 include the core 705, the first fluid inlet manifold 710, the first fluid outlet manifold 715, the second fluid inlet manifold 720, and the second fluid outlet manifold 725. As shown in FIG. 8B, each of the plurality of modules 770 may be stacked to form the heat exchanger 800. Additionally, the core 705, the first fluid inlet manifold 710, the first fluid outlet manifold 715, the second fluid inlet manifold 720, and the second fluid outlet manifold 725 of each of the plurality of modules 870 may be fluidly coupled such that the first fluid flow path 735 and the second fluid flow path 740 are continuous through each of the plurality of modules 870. The plurality of modules 870 allow a size of the heat exchanger 800 to be customizable to suit a particular need and based on a desired position of the heat exchanger 800 within the gas turbine engine 20. For example, a size of the heat exchanger 800 may be modified based on whether the heat exchanger 800 is disposed in the sump 300 (as discussed with respect to FIG. 3) or disposed in a fluid communication with the working gas flow path 50 (as discussed with respect to FIG. 6).

In at least one example embodiment (not shown), the heat exchanger 700 may be disposed or embedded within the core cowl 28, such as in an undercowl region of the core cowl 28, within the bypass airflow passage 72, or any other suitable location for cooling components of the gas turbine engine 20. Moreover, the heat exchanger 700 may comprise a gas-to-gas heat exchanger, a gas-to-liquid heat exchanger, or a liquid-to-liquid heat exchanger. In other example embodiments, the heat exchanger 700 may comprise an air-to-air heat exchanger that is embedded within or in fluid communication with the undercowl region of the core cowl 28 to cool full authority digital engine control ("FADEC") components.

Figure 9:
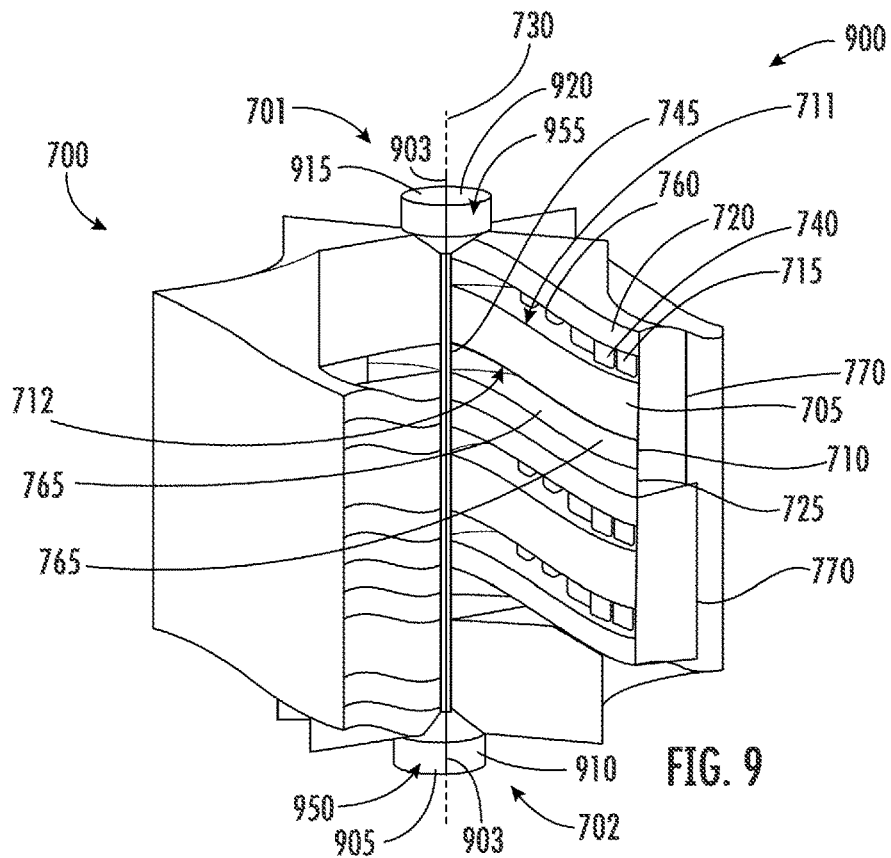
FIG. 9 is a perspective, cross-section view of a heat exchanger in accordance with an exemplary aspect of the present disclosure.

Referring now to FIG. 9, FIG. 9 is a perspective, cross-section view of a heat exchanger 900 in accordance with another exemplary aspect of the present disclosure. The heat exchanger 900 may be used in place of the heat exchanger 700, as shown in FIGS. 7A-8B, in some example embodiments.

In at least one example embodiment, the heat exchanger 900 is similar to the heat exchanger 700, as shown in FIGS. 7A-7B. However, the heat exchanger 900 includes a first end nozzle 955 adjacent the first end 701 and a second end nozzle 950 adjacent the second end 702. The first end nozzle 955 and the second end nozzle 950 may each include a divider 903. For example, the divider 903 may extend along the core axis 730 within each of the first end nozzle 955 and the second end nozzle 950.

In at least one example embodiment, the second end nozzle 950 includes a first fluid inlet side 905 on one side of the divider 903 and a second fluid outlet side 910 on another side of the divider 903. The first fluid inlet side 905 and the second fluid outlet side 910 may be fluidly isolated by the divider 903. The first fluid inlet side 905 may be configured to receive the first fluid and supply the first fluid to the first fluid inlet manifold 710. The second fluid outlet side 910 may be configured to receive the second fluid from the second fluid outlet manifold 725 and discharge the second fluid from the heat exchanger 900.

In at least one example embodiment, the first end nozzle 955 includes a first fluid outlet side 915 on one side of the divider 903 and a second fluid inlet side 920 on another side of the divider 903. The first fluid outlet side 915 and the second fluid inlet side 920 may be fluidly isolated by the divider 903. The first fluid outlet side 915 may be configured to receive the first fluid from the first fluid outlet manifold 715 and discharge the first fluid from the heat exchanger 900. The second fluid inlet side 920 may be configured to receive the second fluid and supply the second fluid to the second fluid inlet manifold 720.

In other example embodiments, the first fluid inlet side 905 may discharge the first fluid received from the first fluid outlet manifold 715 and discharge the first fluid from the heat exchanger 900, and the second fluid outlet side 910 may be configured to receive the second fluid and supply the second fluid to the second fluid inlet manifold 720. In such embodiments, the first fluid outlet side 915 may be configured to supply the first fluid to the first fluid inlet manifold 710, and the second fluid inlet side 920 may be configured to receive the second fluid from the second fluid outlet manifold 725 and discharge the second fluid from the heat exchanger 900.

In at least one example embodiment, the first fluid flow path 735 is configured to flow in a first direction and the second fluid flow path 740 is configured to flow in a second direction through the heat exchanger 900 in a similar manner as the heat exchanger 700 discussed above with respect to FIGS. 7A-8B. For example, the second direction may be opposite the first direction.

In other example embodiments, the first direction and the second direction may be the same. For example, the first fluid flow path 735 and the second fluid flow path 740 are configured to flow in parallel or in the same direction. In such a parallel flow arrangement of the heat exchanger 900, the first fluid inlet side 905 of the second end nozzle 950 is configured to supply the first fluid to the first fluid inlet manifold 710 and the second fluid outlet side 910 of the second end nozzle 950 is configured to supply the second fluid to the second fluid inlet manifold 720. Additionally, the first fluid outlet side 915 of the first end nozzle 955 may be configured to receive the first fluid from the first fluid outlet manifold 715 and discharge the first fluid from the heat exchanger 900, and the second fluid inlet side 920 of the first end nozzle 955 may be configured to receive the second fluid from the second fluid outlet manifold 725 and discharge the second fluid from the heat exchanger 900.

In other example embodiments, the parallel flow arrangement may flow in an opposite direction such that the first fluid outlet side 915 of the first end nozzle 955 is configured to supply the first fluid to the first fluid inlet manifold 710 and the second fluid inlet side 920 of the first end nozzle 955 is configured to supply the second fluid to the second fluid inlet manifold 720. Additionally, the first fluid inlet side 905 of the second end nozzle 950 may configured to receive the first fluid from the first fluid outlet manifold 715 and discharge the first fluid from the heat exchanger 900, and the second fluid outlet side 910 of the second end nozzle 950 may be configured to receive the second fluid from the second fluid outlet manifold 725 and discharge the second fluid from the heat exchanger 900.

Figure 10:
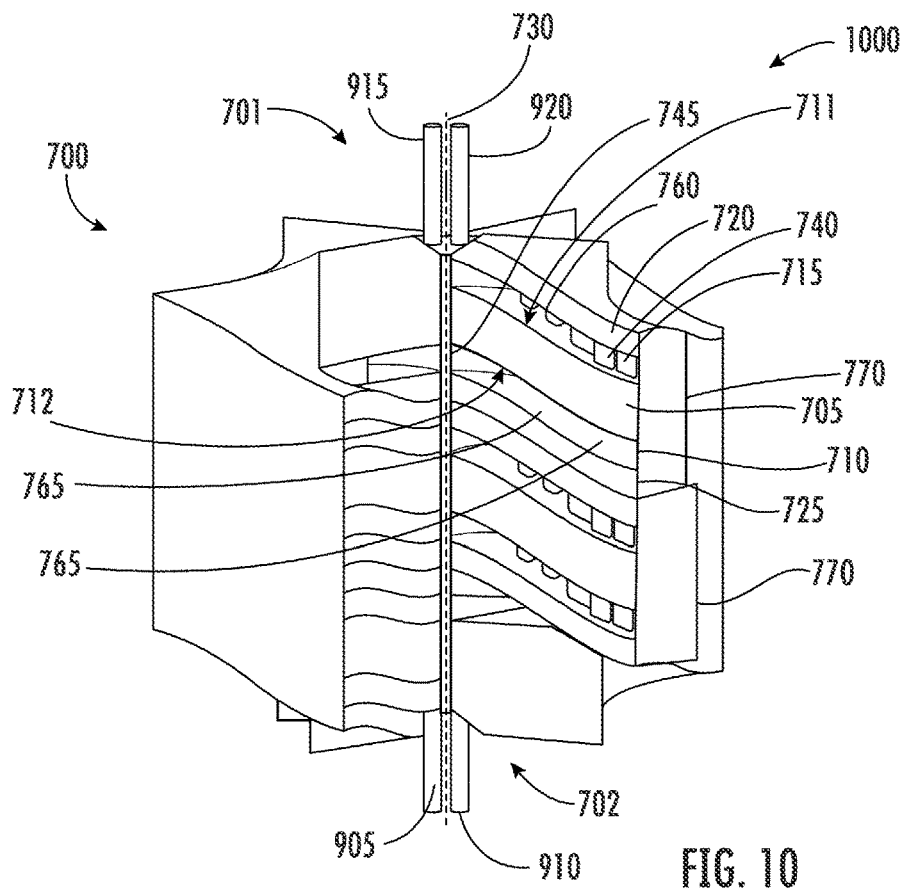
FIG. 10 is a perspective, cross-section view of a heat exchanger in accordance with an exemplary aspect of the present disclosure.

Referring now to FIG. 10, a perspective, cross-section view of a heat exchanger 1000 in accordance with another exemplary aspect of the present disclosure is depicted. The heat exchanger 1000 may be used in place of the heat exchanger 700, as shown in FIGS. 7A-8B, in some example embodiments.

In at least one example embodiment, the heat exchanger 1000 is similar to the heat exchanger 900, as shown in FIG. 9. However, the heat exchanger 1000 includes two distinct tubes in place of the first fluid inlet side 905 and the second fluid inlet side 920 of the second end nozzle 950, as shown in FIG. 10. Similarly, the first fluid outlet side 915 and the second fluid inlet side 920 of the first end nozzle 955 may comprise two distinct tubes, as shown in FIG. 10. The first fluid inlet side 905, the second fluid inlet side 920, the first fluid outlet side 915, and the second fluid inlet side 920 of the heat exchanger 1000 may function in a similar or analogous manner as the first fluid inlet side 905, the second fluid inlet side 920, the first fluid outlet side 915, and the second fluid inlet side 920 of the heat exchanger 900 discussed above with respect to FIG. 9.

Figure 11A:
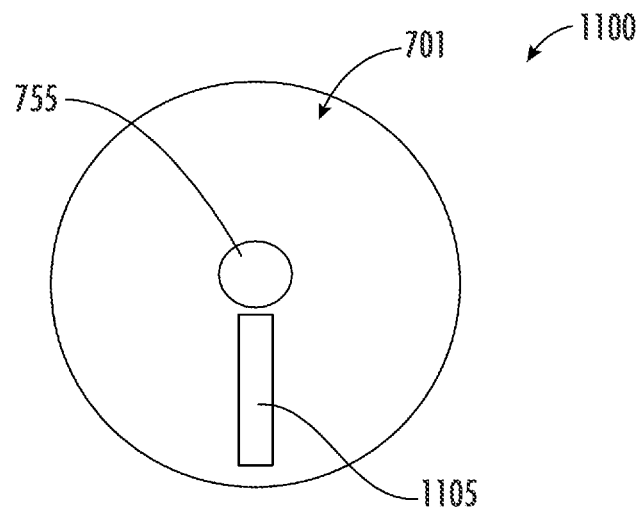
FIG. 11A is a top view of a heat exchanger in accordance with an exemplary aspect of the present disclosure.
Figure 11B:
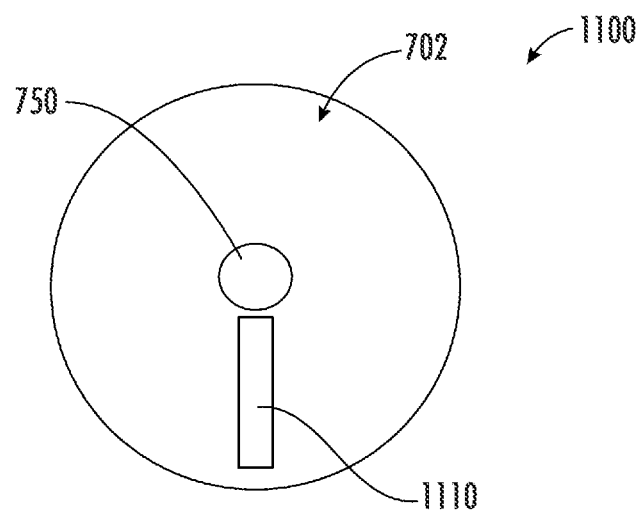
FIG. 11B is a bottom view of the heat exchanger of FIG. 11A in accordance with an exemplary aspect of the present disclosure.

FIG. 11A is a top view of a heat exchanger 1100 in accordance with an exemplary aspect of the present disclosure. FIG. 11B is a bottom view of the heat exchanger 1100 of FIG. 11A in accordance with an exemplary aspect of the present disclosure. The heat exchanger 1100 may be similar or analogous to the heat exchanger 700, as shown in FIGS. 7A-8B, with differences that will be discussed below. Moreover, the heat exchanger 1100 may be used in place of the heat exchanger 700, as shown in FIGS. 7A-8B, in some example embodiments.

In at least one example embodiment, a surface of the heat exchanger 1100 adjacent the first end 701 defines a first opening 1105 and a surface of the heat exchanger 1100 adjacent the second end 702 defines a second opening 1110. The first opening 1105 may be in fluid communication with the second fluid inlet manifold 720 and the second opening 1110 may be in fluid communication with the second fluid outlet manifold 725. In at least one example embodiment, the first fluid inlet manifold 710 receives the first fluid via the second fluid outlet nozzle 750. The first fluid flows from the first fluid inlet manifold 710, through the core 705, through the first fluid outlet manifold 715, and out of the heat exchanger 1100 through the second fluid inlet nozzle 755. The second fluid inlet manifold 720 receives the second fluid via the first opening 1105. The second fluid flows from the second fluid inlet manifold 720, through the first plurality of tubes 760, through the core 705, through the second plurality of tubes 765, through the second fluid outlet manifold 725, and exits the heat exchanger 1100 through the second opening 1110. In such embodiments, the first fluid and the second fluid are in a counter-flow arrangement, as described above with respect to FIGS. 7A-7B. In other example embodiments (not shown), the first fluid and the second fluid may flow through the heat exchanger 1100 in a parallel or co-flow arrangement.

Alternatively, the second fluid outlet nozzle 750 and the second fluid inlet nozzle 755 may be in fluid communication with the second fluid inlet manifold 720 and the second fluid outlet manifold 725. In such embodiments, the first opening 1105 and the second opening 1110 may be in fluid communication with the first fluid inlet manifold 710 and the first fluid outlet manifold 715.

In additional example embodiments, the first opening 1105 may be in fluid communication with the first fluid outlet manifold 715 and the second opening 1110 may be in fluid communication with the first fluid inlet manifold 710. For example, the heat exchanger 1100 may include a plurality of tubes, ducts, or conduits extending through the second fluid inlet manifold 720 and the second fluid outlet manifold 725 for fluidly coupling the first opening 1105 to the first fluid outlet manifold 715 and fluidly coupling the second opening 1110 to the first fluid inlet manifold 710. The plurality of tubes, ducts, or conduits may be similar or analogous to the first plurality of tubes 760 and the second plurality of tubes 765. In such embodiments, the plurality of tubes, ducts, or conduits extending through the second fluid inlet manifold 720 and the second fluid outlet manifold 725 are fluidly isolated from the second fluid inlet manifold 720 and the second fluid outlet manifold 725 to allow for fluid communication within the second fluid inlet manifold 720 and the second fluid outlet manifold 725 between the plurality of tubes, ducts, or conduits.

In such example embodiments, the first fluid enters the first fluid inlet manifold 710 via the second fluid outlet nozzle 750, flows through the core 705 and the first fluid outlet manifold 715, and exits the heat exchanger 1100 through the first opening 1105. The second fluid enters the second fluid inlet manifold 720 through the second fluid inlet nozzle 755, flows through the first plurality of tubes 760, the core 705, the second plurality of tubes 765, and the second fluid outlet manifold 725, and exits the heat exchanger 1100 though the second opening 1110. In such embodiments, the first fluid and the second fluid are in a counter-flow arrangement, as described above with respect to FIGS. 7A-7B. In other example embodiments (not shown), the first fluid and the second fluid may flow through the heat exchanger 1100 in a co-flow arrangement.

Alternatively, the second fluid outlet nozzle 750 and the first opening 1105 may be in fluid communication with the second fluid inlet manifold 720 and the second fluid outlet manifold 725. In such embodiments, the second opening 1110 and the second fluid inlet nozzle 755 may be in fluid communication with the first fluid inlet manifold 710 and the first fluid outlet manifold 715.

In at least one example embodiment, the first opening 1105 and the second opening 1110 may include a slit. For example, one or both of the first opening 1105 and the second opening 1110 may include a rectangular or pie-shaped slit in a surface of the heat exchanger 1100 adjacent the first end 701 and the second end 702, respectively. In other example embodiments, one or both of the first opening 1105 and the second opening 1110 may include a plurality of openings or slits.

Further aspects are provided by the subject matter of the following clauses:

A heat exchanger for a gas turbine engine, comprising: an outer shell extending between a first end and a second end opposite the first end, the outer shell defining a first fluid chamber, a first fluid inlet adjacent the first end, and a first fluid outlet adjacent the second end, the outer shell further defining a first plurality of second fluid inlet openings located between the first end and the second end, and a second fluid outlet adjacent the second end; and a manifold disposed within the outer shell, the manifold defining a second fluid chamber, and a second plurality of second fluid inlet openings; wherein the heat exchanger defines a first fluid pathway extending from the first fluid inlet, through the first fluid chamber, and to the first fluid outlet; and wherein the heat exchanger further defines a second fluid pathway extending from the first plurality of second fluid inlet openings, through the second plurality of second fluid inlet openings, through the second fluid chamber, and to the second fluid outlet.

The heat exchanger of any preceding clause, wherein the first fluid chamber is defined between the outer shell and the manifold.

The heat exchanger of any preceding clause, wherein: the first fluid pathway is configured to receive a first fluid; and the second fluid pathway is configured to receive a second fluid.

The heat exchanger of any preceding clause, wherein the first fluid comprises a flow of cooling air from the gas turbine engine and the second fluid comprises lubrication oil when the heat exchanger is installed in the gas turbine engine.

The heat exchanger of any preceding clause, wherein the first fluid comprises fuel and the second fluid comprises compressed air.

The heat exchanger of any preceding clause, wherein the first fluid pathway is fluidly isolated from the second fluid pathway.

The heat exchanger of any preceding clause, wherein the first fluid pathway is helical.

The heat exchanger of any preceding clause, wherein: the manifold extends between the first end and the second end; the first end of the manifold is sealed; and the second end of the manifold defines at least a portion of the second fluid outlet.

The heat exchanger of any preceding clause, wherein the second plurality of second fluid inlet openings are arranged in a helical pattern about the manifold.

The heat exchanger of any preceding clause, further comprising a plurality of tubes fluidly coupling the first plurality of second fluid inlet openings and second plurality of second fluid inlet openings, the plurality of tubes defining at least a portion of the second fluid pathway.

The heat exchanger of any preceding clause, wherein the plurality of tubes comprise a straight shape, a tortuous shape, a twisted shape, a coiled shape, a zig-zag shape, or a combination thereof.

The heat exchanger of any preceding clause, further comprising a plurality of baffles coupled between each of the plurality of tubes and defining at least a portion of the first fluid pathway.

The heat exchanger of any preceding clause, wherein the plurality of baffles comprise tube fins for increasing a surface area of the first fluid pathway.

The heat exchanger of any preceding clause, wherein the plurality of tubes and the plurality of baffles are arranged in a helical pattern about the manifold.

The heat exchanger of any preceding clause, wherein the plurality of tubes and the plurality of baffles are arranged to form the first fluid pathway with a plurality of turns about the manifold.

The heat exchanger of any preceding clause, wherein the heat exchanger is configured to be disposed in a sump of a lubrication system of the gas turbine engine when the heat exchanger is installed in the gas turbine engine.

A gas turbine engine, comprising: a fan; a turbomachine operably coupled to the fan for driving the fan, the turbomachine comprising a compressor section, a combustion section, and a turbine section in serial flow order and together defining a working gas flow path; a sump disposed in the turbomachine and configured to receive a lubrication oil; and the heat exchanger of any preceding clause disposed in the sump; wherein the first fluid pathway is in fluid communication with the compressor section; and wherein the second fluid pathway is in fluid communication with the sump.

The gas turbine engine of any preceding clause, wherein the second fluid pathway is in fluid communication with a bearing or gearbox assembly of the gas turbine engine.

A gas turbine engine, comprising: a fan; a turbomachine operably coupled to the fan for driving the fan, the turbomachine comprising a compressor section, a combustion section, and a turbine section in serial flow order and together defining a working gas flow path; a fuel delivery system including a fuel source configured to deliver fuel from the fuel source to the combustion section; and the heat exchanger v disposed in fluid communication with the fuel delivery system; wherein the first fluid pathway is in fluid communication with the fuel source; and wherein the second fluid pathway is in fluid communication with the compressor section.

The gas turbine engine of any preceding clause, wherein: the first fluid pathway is in fluid communication with the combustion section; and the second fluid pathway is in fluid communication with the combustion section or the turbine section.

The gas turbine engine of any preceding clause, further comprising one or more secondary heat exchangers in fluid communication with the first fluid pathway.

A heat exchanger for a gas turbine engine, comprising: a core including a plurality of unit cells, the core defining a core axis and having a helical shape extending about the core axis between a first end and a second end, the core including a first side adjacent the first end and a second side adjacent the second end, each unit cell of the plurality of unit cells defining a first fluid flow path and a second fluid flow path; a first fluid inlet manifold in fluid communication with the first fluid flow path; a first fluid outlet manifold in fluid communication with the first fluid flow path; a second fluid inlet manifold in fluid communication with the second fluid flow path, the second fluid inlet manifold defining a plurality of second fluid inlets adjacent the first end or the second end; a second fluid outlet manifold in fluid communication with the second fluid flow path; and a second fluid inlet nozzle adjacent the first end and in fluid communication with the second fluid inlet manifold; and a second fluid outlet nozzle adjacent the second end and in fluid communication with the second fluid outlet manifold; wherein the first fluid inlet manifold, the first fluid outlet manifold, the second fluid inlet manifold, and the second fluid outlet manifold each have a helical shape extending about the core axis between the first end in and the second end.

The heat exchanger of any preceding clause, wherein the second fluid outlet manifold defines a second fluid outlet opening opposite the plurality of second fluid inlets.

The heat exchanger of any preceding clause, wherein: the first fluid inlet manifold is adjacent the second side of the core; the first fluid outlet manifold is adjacent the first side of the core; the second fluid inlet manifold is adjacent the first side of the core; and the second fluid outlet manifold is adjacent the second side of the core.

The heat exchanger of any preceding clause, wherein: the first fluid inlet manifold is between the core and the second fluid outlet manifold; and the first fluid outlet manifold is between the core and the second fluid inlet manifold.

The heat exchanger of any preceding clause, wherein: the first fluid inlet manifold is adjacent the first side of the core; the first fluid outlet manifold is adjacent the second side of the core; the second fluid inlet manifold is adjacent the second side of the core; and the second fluid outlet manifold is adjacent the first side of the core.

The heat exchanger of any preceding clause, wherein: the second fluid outlet manifold is between the core and the first fluid inlet manifold; and the first fluid outlet manifold is between the core and the second fluid inlet manifold.

The heat exchanger of any preceding clause, wherein the first fluid flow path and the second fluid flow path are fluidly isolated.

The heat exchanger of any preceding clause, wherein: the first fluid inlet manifold includes a first plurality of tubes; the first fluid outlet manifold includes a second plurality of tubes; and the first plurality of tubes and the second plurality of tubes define at least a portion of the second fluid flow path.

The heat exchanger of any preceding clause, wherein: the first fluid flow path is configured to flow in a first direction; the second fluid flow path is configured to flow in a second direction; and the first direction is opposite the second direction.

The heat exchanger of any preceding clause, wherein: the first direction is about the core axis from the first end to the second end; and the second direction is about the core axis from the second end to the first end.

The heat exchanger of any preceding clause, wherein: the first fluid flow path is configured to flow in a first direction; the second fluid flow path is configured to flow in a second direction; and the first direction is the same as the second direction.

The heat exchanger of any preceding clause, further comprising: a plurality of modules; wherein each of the plurality of modules include the core, the first fluid inlet manifold, the first fluid outlet manifold, the second fluid inlet manifold, and the second fluid outlet manifold.

The heat exchanger of any preceding clause, wherein the plurality of modules are arranged in a stacked relationship.

The heat exchanger of any preceding clause, wherein: the first fluid inlet manifold defines a plurality of first fluid inlets adjacent an outer circumferential end of the first fluid inlet manifold configured to receive a first fluid; and the second fluid inlet manifold is configured to receive a second fluid via the second fluid inlet nozzle.

The heat exchanger of any preceding clause, wherein: the first fluid outlet manifold is configured to discharge a first fluid via a first fluid outlet nozzle; and the second fluid outlet manifold is configured to receive a second fluid via the second fluid outlet nozzle.

The heat exchanger of any preceding clause, wherein: the first fluid inlet manifold is configured to receive a first fluid via a first fluid inlet nozzle; and the second fluid inlet manifold is configured to receive a second fluid via the second fluid inlet nozzle.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

We claim:

1. A heat exchanger for a gas turbine engine, comprising:
   an outer shell extending between a first end and a second end opposite the first end, the outer shell defining a first fluid chamber, a first fluid inlet adjacent the first end, and a first fluid outlet adjacent the second end, the outer shell further defining a first plurality of second fluid inlet openings located between the first end and the second end, and a second fluid outlet adjacent the second end;
   a manifold disposed within the outer shell, the manifold defining a second fluid chamber, and a second plurality of second fluid inlet openings;
   a plurality of tubes fluidly coupling the first plurality of second fluid inlet openings and the second plurality of second fluid inlet openings; and
   a plurality of baffles, each baffle of the plurality of baffles coupled between adjacent ones of the plurality of tubes;

wherein the heat exchanger defines a first fluid pathway extending from the first fluid inlet, through the first fluid chamber, and to the first fluid outlet; and wherein the heat exchanger further defines a second fluid pathway extending from the first plurality of second fluid inlet openings, through the second plurality of second fluid inlet openings, through the second fluid chamber, and to the second fluid outlet; and wherein the plurality of tubes and the plurality of baffles define a helical surface defining the first fluid pathway about the manifold.

2. The gas turbine engine of claim 1, wherein the first plurality of second fluid inlet openings are disposed along a length of the outer shell defined between the first end and the second end, and wherein each of the first plurality of second fluid inlet openings are in fluid communication with a sump of the gas turbine engine.

3. The heat exchanger of claim 1, wherein the first fluid chamber is defined between the outer shell and the manifold.

4. The heat exchanger of claim 1, wherein:
the first fluid pathway is configured to receive a first fluid; and
the second fluid pathway is configured to receive a second fluid.

5. The heat exchanger of claim 4, wherein the first fluid comprises a flow of cooling air from the gas turbine engine and the second fluid comprises lubrication oil when the heat exchanger is installed in the gas turbine engine.

6. The heat exchanger of claim 4, wherein the first fluid comprises fuel and the second fluid comprises compressed air.

7. The heat exchanger of claim 1, wherein the first fluid pathway is fluidly isolated from the second fluid pathway.

8. The heat exchanger of claim 1, wherein the first fluid pathway is helical.

9. The heat exchanger of claim 1, wherein:
the manifold extends between the first end and the second end;
the first end of the manifold is sealed; and
the second end of the manifold defines at least a portion of the second fluid outlet.

10. The heat exchanger of claim 1, wherein the second plurality of second fluid inlet openings are arranged in a helical pattern about the manifold.

11. The heat exchanger of claim 1, wherein the plurality of tubes define at least a portion of the second fluid pathway.

12. The heat exchanger of claim 1, wherein the plurality of tubes comprise a straight shape, a tortuous shape, a twisted shape, a coiled shape, a zig-zag shape, or a combination thereof.

13. The heat exchanger of claim 1, wherein the plurality of baffles comprise tube fins for increasing a surface area of the first fluid pathway.

14. The heat exchanger of claim 1, wherein the plurality of tubes and the plurality of baffles are arranged to form the first fluid pathway with a plurality of turns about the manifold.

15. The heat exchanger of claim 1, wherein the heat exchanger is configured to be disposed in a sump of a lubrication system of the gas turbine engine.

16. A gas turbine engine, comprising:
a fan;
a turbomachine operably coupled to the fan for driving the fan, the turbomachine comprising a compressor section, a combustion section, and a turbine section in serial flow order and together defining a working gas flow path;

a sump disposed in the turbomachine and configured to receive a lubrication oil; and
a heat exchanger disposed in the sump, the heat exchanger comprising:
an outer shell extending between a first end and a second end opposite the first end, the outer shell defining a first fluid chamber, a first fluid inlet adjacent the first end, and a first fluid outlet adjacent the second end, the outer shell further defining a first plurality of second fluid inlet openings located between the first end and the second end, and a second fluid outlet adjacent the second end,
a manifold disposed within the outer shell, the manifold defining a second fluid chamber, and a second plurality of second fluid inlet openings,
a plurality of tubes fluidly coupling the first plurality of second fluid inlet openings and the second plurality of second fluid inlet openings, and
a plurality of baffles, each baffle of the plurality of baffles coupled between adjacent ones of the plurality of tubes,
wherein the heat exchanger defines a first fluid pathway extending from the first fluid inlet, through the first fluid chamber, and to the first fluid outlet and in fluid communication with the compressor section, and
wherein the heat exchanger further defines a second fluid pathway extending from the first plurality of second fluid inlet openings, through the second plurality of second fluid inlet openings, through the second fluid chamber, and to the second fluid outlet and in fluid communication with the sump, and
wherein the plurality of tubes and the plurality of baffles define a helical surface defining the first fluid pathway about the manifold.

17. The gas turbine engine of claim 16, wherein the second fluid pathway is in fluid communication with a bearing or gearbox assembly of the gas turbine engine.

18. A gas turbine engine, comprising:
a fan;
a turbomachine operably coupled to the fan for driving the fan, the turbomachine comprising a compressor section, a combustion section, and a turbine section in serial flow order and together defining a working gas flow path;
a fuel delivery system including a fuel source configured to deliver fuel from the fuel source to the combustion section; and
a heat exchanger disposed in fluid communication with the fuel delivery system, the heat exchanger comprising:
an outer shell extending between a first end and a second end opposite the first end, the outer shell defining a first fluid chamber, a first fluid inlet adjacent the first end, and a first fluid outlet adjacent the second end, the outer shell further defining a first plurality of second fluid inlet openings located between the first end and the second end, and a second fluid outlet adjacent the second end,
a manifold disposed within the outer shell, the manifold defining a second fluid chamber, and a second plurality of second fluid inlet openings,
a plurality of tubes fluidly coupling the first plurality of second fluid inlet openings and the second plurality of second fluid inlet openings, and
a plurality of baffles, each baffle of the plurality of baffles coupled between adjacent ones of the plurality of tubes, wherein the heat exchanger defines a first fluid pathway extending from the first fluid inlet, through the first fluid chamber, and to the first fluid outlet and in fluid communication with the fuel source, and wherein the heat exchanger further defines a second fluid pathway extending from the first plurality of second fluid inlet openings, through the second plurality of second fluid inlet openings, through the second fluid chamber, and to the second fluid outlet and in fluid communication with the compressor section, and wherein the plurality of tubes and the plurality of baffles define a helical surface defining the first fluid pathway about the manifold.

19. The gas turbine engine of claim 18, wherein:

the first fluid pathway is in fluid communication with the combustion section; and the second fluid pathway is in fluid communication with the combustion section or the turbine section.

\* \* \* \* \*